United States Patent [19]

Mehaffey et al.

[11] 4,286,118

[45] Aug. 25, 1981

[54] DATA DISTRIBUTION SYSTEM FOR PRIVATE AUTOMATIC BRANCH EXCHANGE

[75] Inventors: Joseph H. Mehaffey, Atlanta; Aleksander Szlam, Marietta, both of Ga.

[73] Assignee: Solid State Systems, Inc., Marietta, Ga.

[21] Appl. No.: 54,146

[22] Filed: Jul. 2, 1979

[51] Int. Cl.³ .................. H04M 1/56; H04M 3/64; H04Q 3/56; H04Q 3/64
[52] U.S. Cl. ................. 179/18 AD; 179/5.5; 179/18 AB; 179/18 J; 179/27 D; 179/27 FC
[58] Field of Search ....... 179/18 AD, 18 FG, 18 AB, 179/27 FC, 99 LS, 99 M, 84 L, 18 J, 5.5, 7 R, 27 D; 370/92, 96

[56] References Cited

U.S. PATENT DOCUMENTS

| | | | |
|---|---|---|---|
| 3,060,273 | 10/1962 | Nowak et al. | 179/27 G |
| 3,483,328 | 12/1969 | Tanke | 179/7 R |
| 3,604,857 | 9/1971 | Opferman | 179/99 M |
| 3,746,797 | 7/1973 | Meise, Jr. et al. | 179/18 FG X |
| 3,787,834 | 1/1974 | Elliott | 340/784 |
| 3,816,768 | 6/1974 | Stein | 307/296 |
| 3,908,099 | 9/1975 | Borbas et al. | 179/175.2 R |
| 3,909,545 | 9/1975 | Fuchs | 179/27 G |
| 3,919,568 | 11/1975 | Minner | 307/296 |
| 3,928,732 | 12/1975 | Simon et al. | 179/27 FC X |
| 3,935,396 | 1/1976 | Barsellotti et al. | 179/99 M |
| 3,996,424 | 12/1976 | Agricola | 179/18 J |
| 4,081,614 | 3/1978 | Dahlquist et al. | 179/18 AD |
| 4,109,242 | 8/1978 | Channin | 340/784 |
| 4,136,263 | 1/1979 | Williams | 179/18 AD X |
| 4,174,466 | 11/1979 | Broger et al. | 179/18 AD |
| 4,203,011 | 5/1980 | Coviello | 179/99 M |

Primary Examiner—Thomas W. Brown
Attorney, Agent, or Firm—Jones, Thomas & Askew

[57] ABSTRACT

A data distribution system for a private branch telephone exchange for providing information to a plurality of PBX stations. Two embodiments (serial and parallel) including addressable stations are shown. Memory devices driving a plurality of displays at each station are updated in response to command signals from a controller preceded by the station address. Each station may communicate with the controller and transmit keyed-in signals or information reflecting station availability. A novel multiplexed LCD, switching matrix bypass upon controller failure circuit, and bus protection circuit upon remote power supply failure are also shown.

7 Claims, 11 Drawing Figures

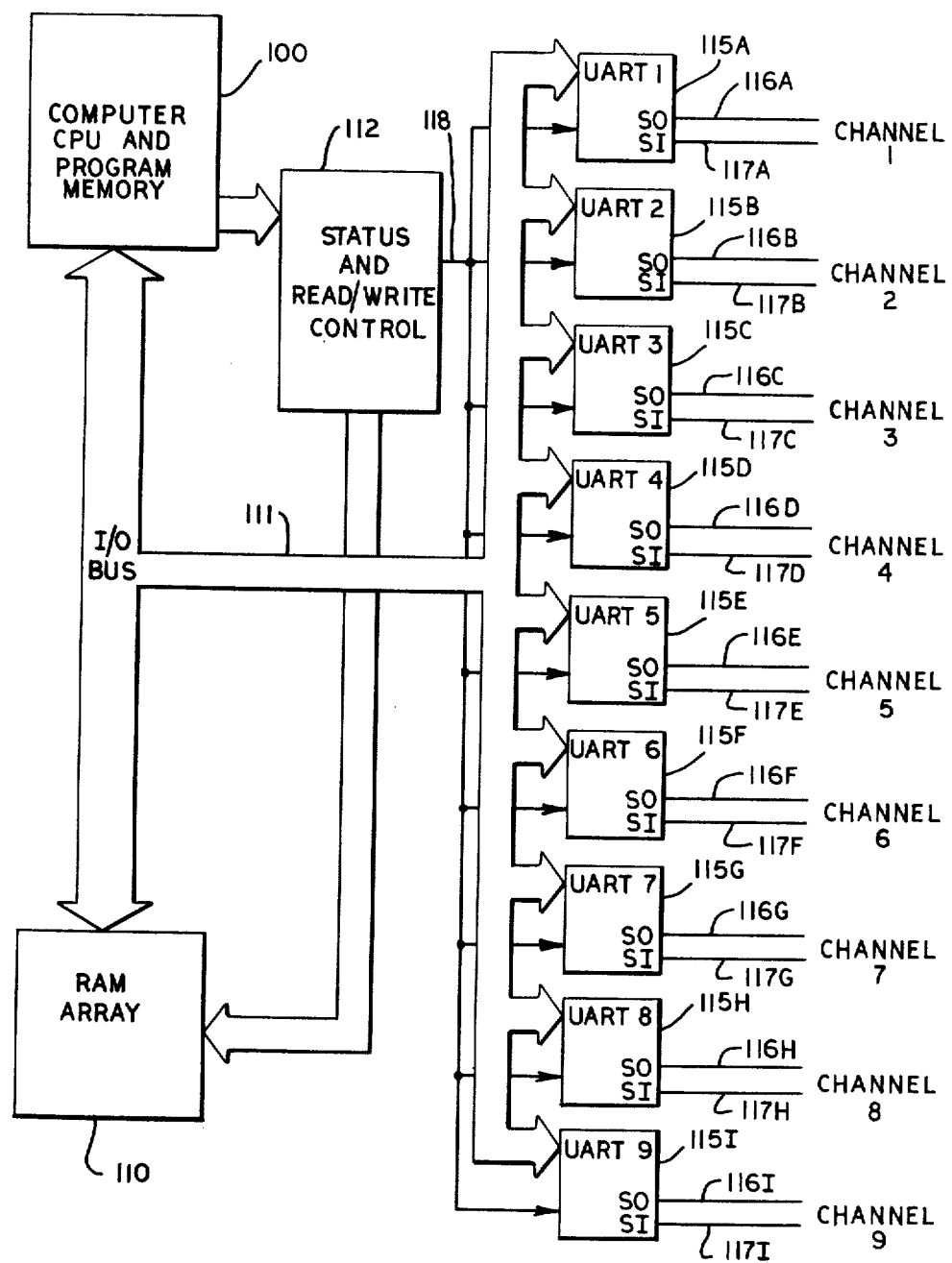
Fig_1A

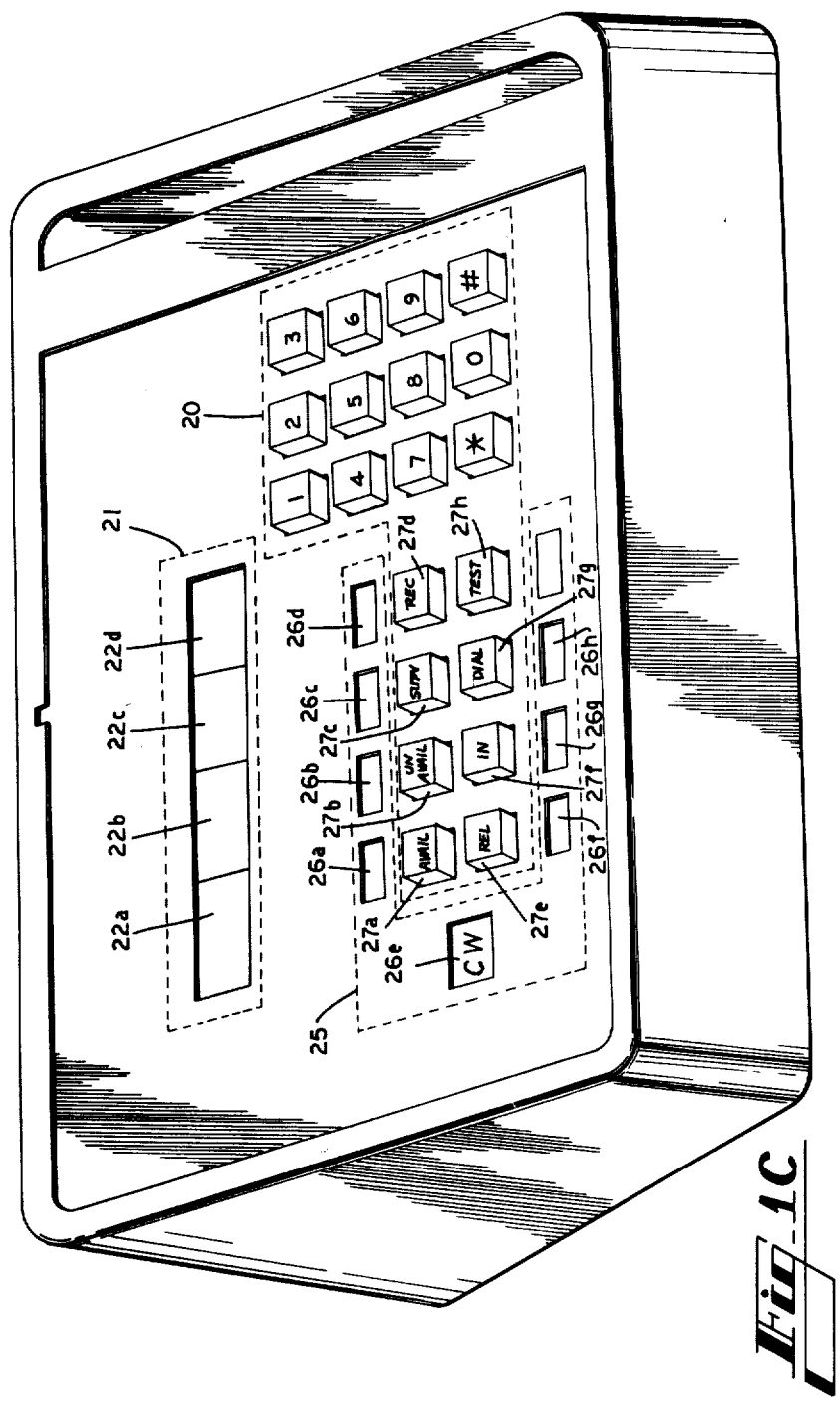

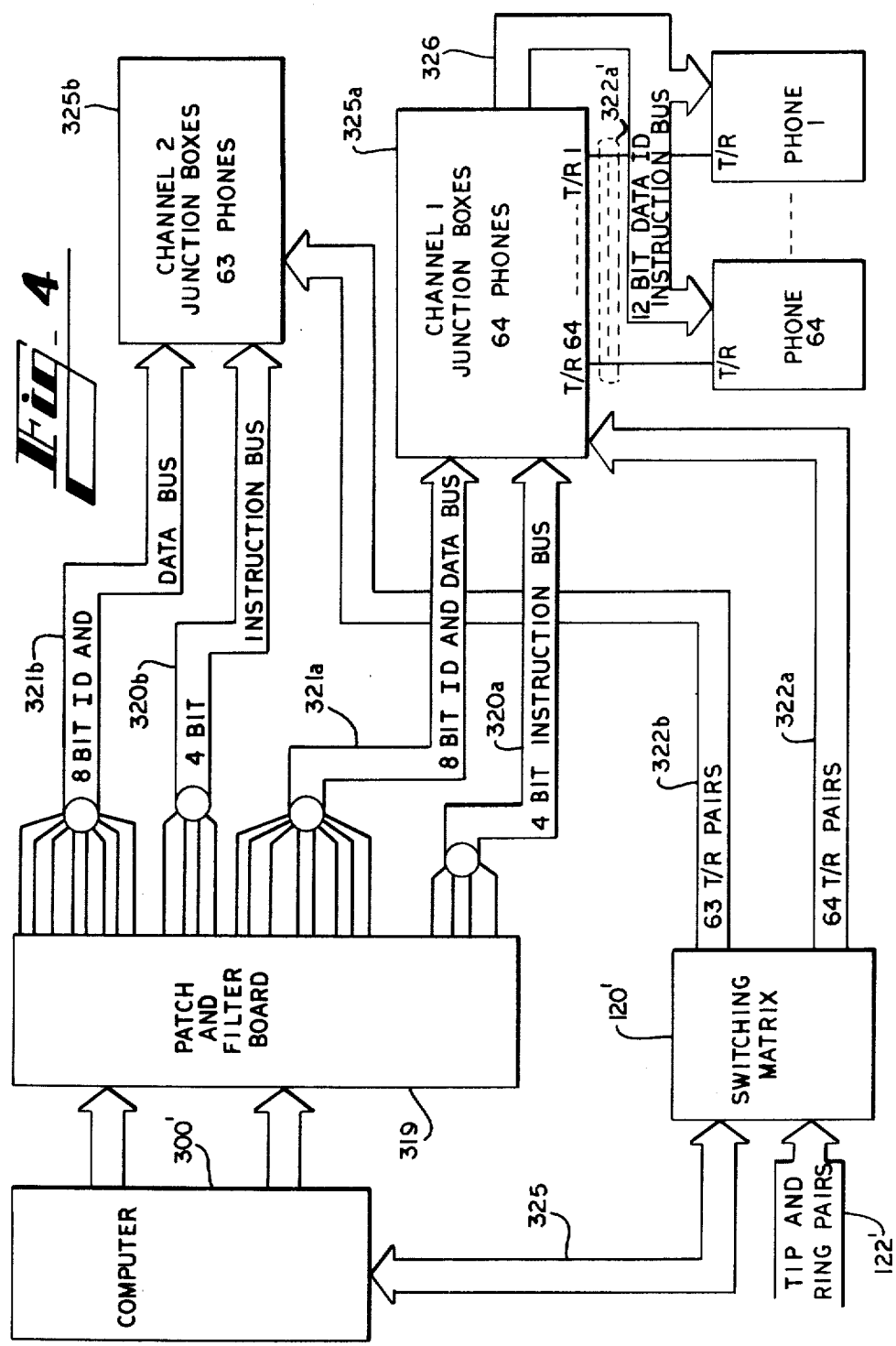

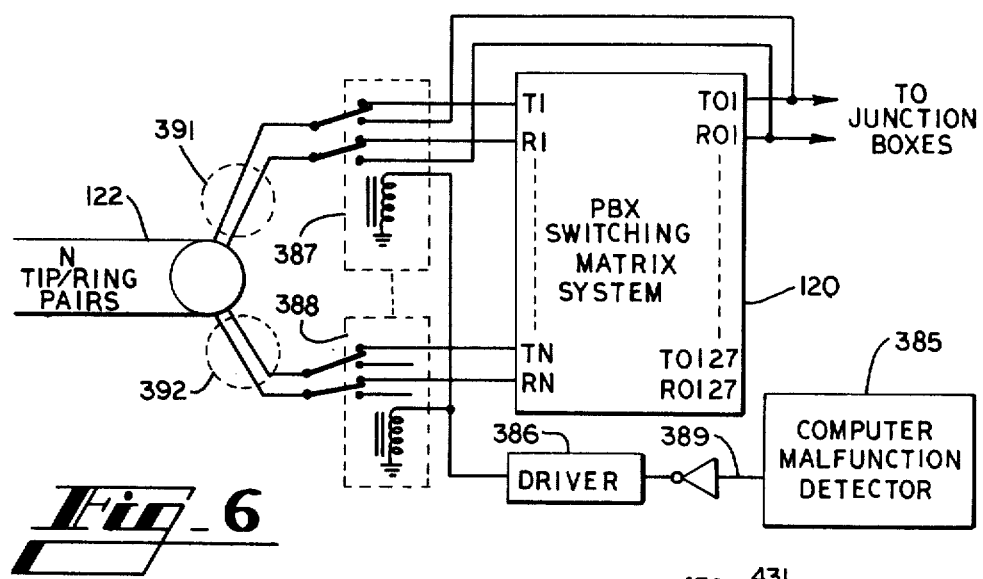
Fig_6
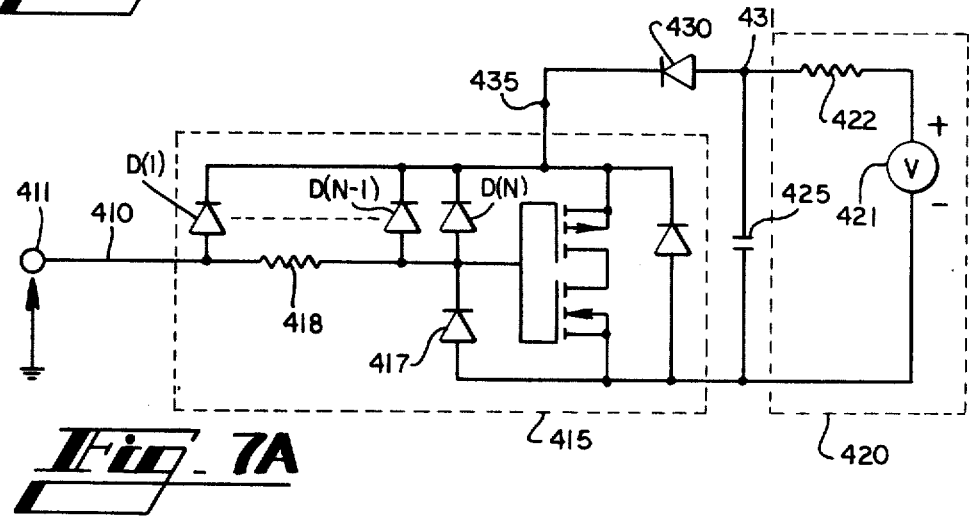
Fig_7A
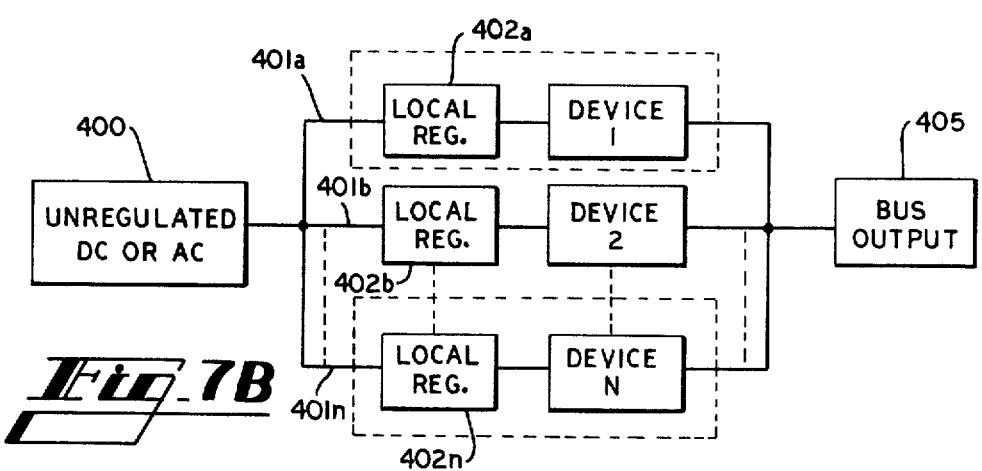
Fig_7B

DATA DISTRIBUTION SYSTEM FOR PRIVATE AUTOMATIC BRANCH EXCHANGE

TECHNICAL FIELD

The present invention relates to private branch exchange telephony and more specifically to a data distribution system for transmitting information as to individual station status, the status of a connection between a trunk line and a station, and the status of the entire branch exchange to and from a central controller and individual stations.

BACKGROUND OF THE INVENTION

In recent years many advances have been made in private branch exchange (PBX) telephony. Small PBX systems which may handle calls from less than ten trunk lines have become economically feasible for small business operations, and very sophisticated private automatic branch exchange (PABX) systems have been built which allow connections to PABX stations from outside trunk lines in the order in which the incoming calls on the trunks were received.

In large PABX systems, such as airline reservation centers, it has been desirable to provide each station within the exchange that is receiving incoming trunk calls with information as to the origin of the call being handled. For example, it is often the case that an airline reservation center is located in one city but trunks from a large number of cities are connected to the PABX system of the reservation center. Heretofore such information to station operators has been provided by relatively costly displays such as cathode ray tube alpha-numeric displays.

On smaller PBX installations, only a limited amount of information has been available from the signal conditions on individual branch lines, such as a light indicating that the line is in use, or a "hold" condition exists on the line.

In the past there has not been an economical way of providing a relatively small PBX or PABX system with information which indicates the source of an incoming call. Furthermore, PABX systems have not been able to provide an economical display at each station which gives information as to origin of incoming calls, total system incoming call backlog and other information which will allow the station operator to respond appropriately to a caller.

SUMMARY OF THE INVENTION

The present invention generally comprises a data distribution system for a private branch telephone exchange which provides information to each station (or a plurality of stations) of the private exchange concerning status of a call to or from the particular station or the incoming call load on the entire exchange, and provides to each station in the exchange information as to the origin (or destination or other pertinent data of interest to the telephone user) of the call to which the station is presently connected. The present invention also provides a plurality of visible indicia at each station which indicate the present status of the station. Furthermore, the present invention provides a means to provide information to each station indicating upon which of a plurality of trunk lines a call originating at the station is being carried. The present invention further provides a means for transmitting status and dialing information from each station to and from a central controller for the exchange.

More specifically, the environment of the present invention includes a private branch telephone exchange having a plurality of incoming trunk tip and ring pairs carrying calls to the exchange. A switching matrix distributes incoming calls to various stations within the exchange. A computer operated controller of the present invention includes a portion of memory for storing data indicative of the class of trunk to which each station is currently connected. When a station operator receives an incoming call, the present invention will transmit data to the station indicative of the origin of the call so that the station operator may more appropriately respond to the caller.

The controller of the present invention also maintains a count of the total number of incoming calls which have not been answered and the number of stations having operators present. The controller will transmit to each station data indicative of the total backlog of unanswered calls coming into the exchange.

Each station may originate calls either internal to the exchange or to an outside trunk, and the data distribution system of the present invention will carry a plurality of signals representing a key stroke sequence for dialing a telephone number from a dialing station to the controller which in turn generates either dial pulses or dual tone signals on the trunk line for an outgoing call.

A plurality of dedicated keys at each station allow the station operator to affect the status of the station, receive incoming calls, originate outgoing calls, and perform tests internal to the exchange to ensure that the display at the station is operating properly.

In a preferred form, each station of the present invention includes a display comprising both a multi-section alpha-numeric display and a plurality of individual status lights which are preferably embodied by light emitting diodes. The alpha numeric display displays information concerning source of a call, identifies another station in the exchange to which the particular station is connected, and may also be used to display time of day or other information conveniently displayed in a small number of alpha numeric characters.

The status lights of the display and alpha-numeric display of the present invention will indicate inter alia the total backlog of unanswered calls, whether the station operator has indicated to the controller that the station is available or unavailable to receive incoming calls, whether an incoming call has been accepted by the station and various parameters concerning outgoing calls from the station.

In the present invention, information from the controller to the station displays and from the station keyboard to the controller is transmitted via a bidirectional data distribution system. The present invention contemplates a multi-drop data distribution system wherein the controller communicates with the stations of the exchange through a plurality of data channels. Each channel has associated therewith a plurality of stations and each station is associated with a particular address unique to that station on its particular channel.

When the controller is to communicate with a particular station, the channel with which the particular station communicates is first identified, then an address signal corresponding to the address of the particular station on that channel is transmitted on the data bus. Only the channel having the corresponding address will respond to subsequent data signals. The transmission of a new address on the channel will cause all stations to compare the new address signal on the data channel with their own particular identifying address and only the station with an address corresponding to the transmitted address will respond to subsequent data signals. In an alternate embodiment, packet data switching techniques could be used.

When status information from the keyboard of a station or another status parameter such as an indication that the station operator has unplugged the headset is transmitted from each station to the controller. In one form of the present invention the controller must have addressed the particular station in order to receive data therefrom. In another preferred form of the invention, each station transmits its identifying address prior to transmitting data back to the controller and therefore does not have to wait until the controller addresses the station.

It will therefore be appreciated that the present invention provides a relatively simple and inexpensive way to distribute and to receive from a plurality of stations in a private branch exchange a large amount of information by the use of a multi-drop bus oriented data distribution system.

According to another aspect of the present invention, a plurality of stations for each channel are each attached to a plurality of junction boxes having a localized power supply for the data distribution circuitry. A plurality of such junction boxes are connected to each data distribution channel and the present invention provides a means for localizing any power supply failure at a junction box and thus preventing a junction box power supply failure from disabling the remaining stations connected to the same channel.

According to still another aspect of the present invention, the hook switch status of each station is automatically checked upon receipt of one of a predetermined set of data signals from the controller and, if the station hook switch status is changed since the last time the controller acknowledged the hook switch status, the station automatically transmits information to the controller indicating the change in status.

It is an object of the present invention to provide a data distribution system for a private branch exchange system which will provide information to each station within the exchange as to origin of an incoming call and total system backlog.

It is a further object of the present invention to provide a multi-drop data distribution system particularly suited for private branch exchange telephony or private automatic branch exchange telephony which may be economically implemented for exchanges of various sizes and which are easily expandable.

It is a further object of the present invention to provide a data distribution system for a PBX system wherein a plurality of stations are connected to a common data bus wherein each station has associated therewith an address unique to that bus, and each data transmission to the station is preceded by an address code which will render the station responsive to a subsequent data sequence, byte or word if the address code corresponds to the station address.

It is still a further object of the present invention to provide a bidirectional data distribution system between a central controller for a private branch exchange and a plurality of exchange stations wherein displayed information as to origin of call, call progress, time of day, number dialed, system load, and other pertinent information are transmitted from the central controller to each station and status information and keyboard inputs are transmitted from each station to the central controller on the same bus.

It is still a further object of the present invention to provide a unique and inexpensive multiplexed display for each station in a private branch exchange.

It is still a further object of the present invention to provide a multidrop data distribution system for a private branch exchange wherein failure of a localized power supply serving some stations on a bus will not disable the remaining stations connected to the bus.

These and other objects of the present invention will be appreciated from the detailed description hereinbelow.

BRIEF DESCRIPTION OF THE DRAWINGS

FIG. 1A is a block diagram of the interface between a controller of the present invention and a first preferred embodiment of the data transmission system of the present invention.

FIG. 1C is a pictorial view of a station unit of the present invention.

FIG. 4 is a block diagram of the data and audio signal path distribution system of the second preferred embodiment of the present invention.

FIG. 6 is a diagram of the default trunk connection apparatus of the present invention.

FIG. 7A is a schematic diagram of the bus loading protection apparatus of the present invention.

FIG. 7B is a block diagram of the local power supply distribution of the present invention.

DETAILED DESCRIPTION OF THE PREFERRED EMBODIMENTS

Figure 1B:
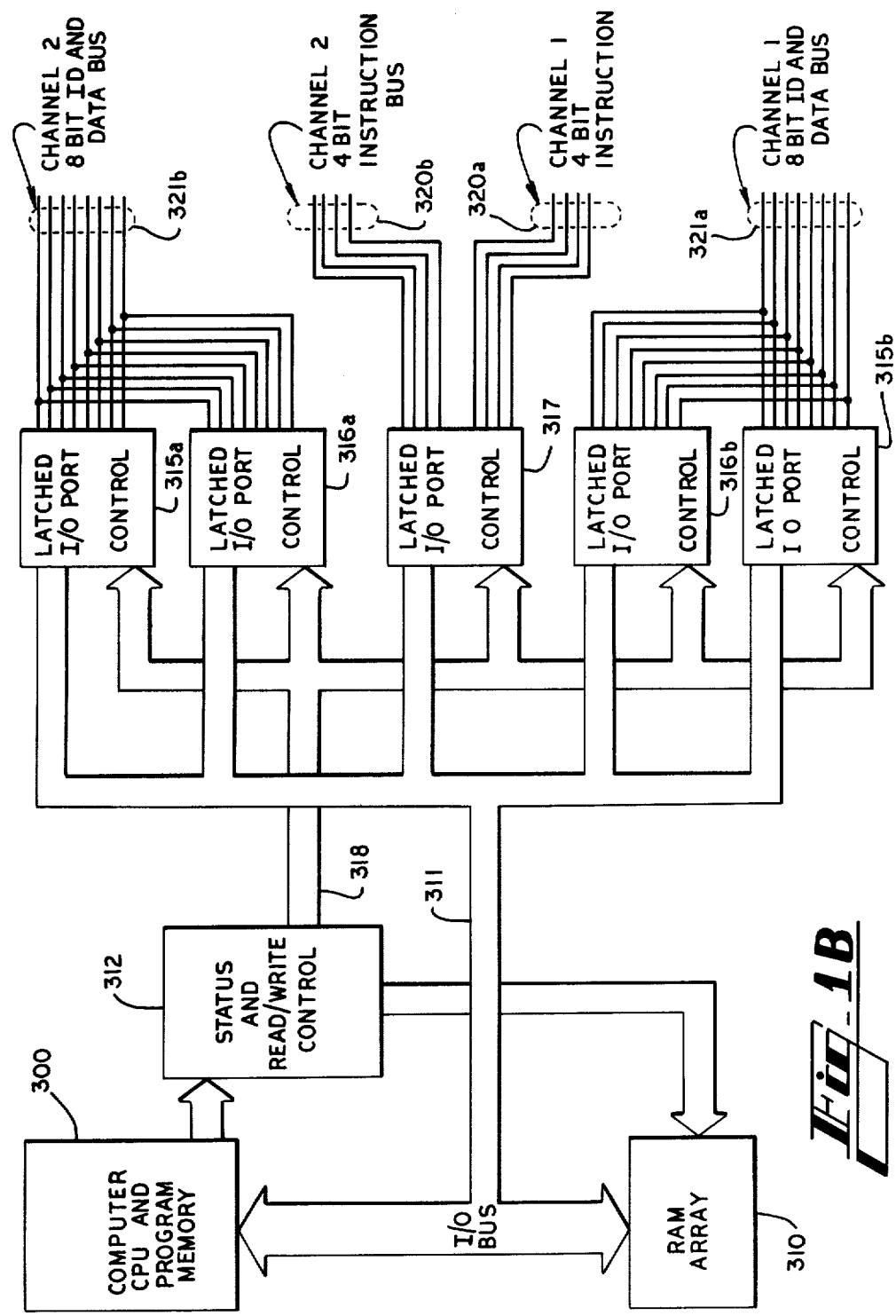
FIG. 1B is a block diagram of the interface between a controller of the present invention and the data transmission system of a second preferred embodiment of the present invention.

The preferred embodiments of the present invention are disclosed in a private automatic branch exchange (PABX) environment but it is to be understood that the present invention is useful in many PBX environments other than those which automatically distribute a plurality of incoming trunk calls such as a PABX.

FIG. 1C is a pictorial view of a station (telephone) of the preferred embodiments of the present invention. The preferred embodiment of the station shown in FIG. 1C includes a twenty key keyboard 20. The twelve rightmost keys shown in FIG. 1C comprise a twelve key telephone key pad. It is to be understood that the twelve rightmost keys of keyboard 20 simply provide row and column output signals upon operation thereof and do not directly cause generation of dual tone signals or dial pulses at the station of FIG. 1C. The remaining eight keys 27a–27h are selectively operable by the station operator to change the status of the station, to originate outgoing calls, and to generate a test of the display of the station by the controller.

The station of FIG. 1C will also be understood to include a conventional headset which may be plugged into the station at a jack point (not shown) when the operator thereof is present.

There are two parts to the display of the station of FIG. 1C. An alpha numeric display comprising four section, sixteen segment liquid crystal display (LCD) 21 is used to receive alpha numeric information indicative of the origin of an incoming call and may also be used to display time of day and other pertinent information. LCD 21 comprises four sixteen segment sections 22a–22d.

The remaining portion of the display of the preferred embodiment of each station comprises an array of selectively actuatable segments 25. The preferred embodiment uses eight light emitting diodes 26a–26h.

When the station operator's headset (not shown) is connected, it is to be understood that operation of key 27a will transmit a signal to the controller indicating that the station is available to receive incoming calls and that operation of key 27b will transmit a signal indicating that the station operator, though present, is unavailable to receive incoming calls. Whenever the operator's headset is disconnected, the system software alternately reverts the system status and display to the unavailable mode for the particular set so affected. Operation of key 26c generates signals which will cause the station to originate a call to a supervisor. Operation of key 26d transmit a signal to the controller indicating that the present call connected to the station should be recorded due to some unusual nature of the call such as a bomb threat.

It is to be understood that when the controller receives a signal indicating operation of one of keys 27a–27d, the controller will acknowledge by transmitting a data signal which will cause the particular LED from LED's 26a–26d associated with the operated key to become lit indicating the computer is able to perform the requested function.

LED 26e is operated by the controller to indicate the total backlog of unanswered incoming calls. In the preferred embodiment, the controller will cause LED 26e to be continuously lit when one, two, or three calls are waiting for the station of FIG. 1C. The controller will cause LED 26e to be intermittently lit when a number of calls greater than a predetermined number are waiting for service from the station within the exchange.

Operation of key 27e corresponds to release of a previously connected call and may be conveniently considered to correspond to "hanging up" a conventional telephone. Operation of key 27f transmits a signal to the controller indicating that the station is prepared to answer an incoming call, or it may be used to place a previously connected call on hold. It is to be understood that light emitting diodes 26f and 26d will be lit upon operation of keys 27e and 27f, respectively, when the operator of the station depresses said keys to answer a call. A call waiting dialed directly to a station will be indicated by a "flagging" of LED 26G.

Operation of key 27g transmits a signal to the controller indicating that a series of data signals representing the telephone number of an outgoing call originating at the station will follow. Operation of key 27g will cause the controller to acknowledge by transmitting a signal causing LED 26h to become lit.

It should be understood that the controller includes apparatus which actually generates dual tone or dial pulse outputs to a trunk line on an outgoing call. The controller will output an appropriate dialed telephone digit in response to operation of the keys of keyboard 20.

In the preferred embodiment shown in FIG. 1C, operation of key 27h transmits a signal to the controller which will cause the controller to transmit back data which will test the working condition of both LCD 21 and light emitting diode array 25.

FIG. 1A is a block diagram of the interface between a controller for the PABX and the data distribution lines. The controller comprises a computer 100 which reads and writes from a RAM array 110 via an input-/output bus 111. The computer 100 also controls status and read/write control circuitry shown in block 112 of FIG. 1A. Computer 100 and RAM array 110 communicate along I/O bus 111 with a plurality of universal asynchronous receiver/transmitters (UART) 115a–115i. Each UART is addressable and may be embodied by a type MC14469 CMOS addressable UART currently manufactured by Motorola Semiconductor Products. The addressable feature of such a device is discussed in more detail hereinbelow.

Each of UARTs 115a–115i has a serial output line 116a–116i, respectively. As will be understood by those skilled in the art the serial output line of a UART is a line over which the UART transmits serial data to another device. Similarly each of UARTs 115a–115i has a serial input line, 117a–117i, respectively, from which the UART receives serial data from another device.

As may be seen from FIG. 1A, the serial out and serial in (SO and SI) lines for each of UARTs 115a–115i form a data channel designated as channel 1 through channel 9. In the first preferred embodiment of the present invention, channel 9 is designated for supervision and debugging of the program of computer 100. Channels 1–8 are data communication channels to the stations of the PABX but it is to be understood that the selection of eight channels and the particular connections to each channel described hereinbelow are only preferred and should not be considered as limiting the scope of the present invention.

It is to be understood that status and read/write control circuitry 112 provides signals along a control bus designated 118 which controls the transmission of data from UARTs 115a–115i and alerts the read/write control circuitry when a complete data word has been received by one of the UARTs and is ready for transmission to I/O bus 111.

It will thus be understood that when computer 100 provides signals to status and read/write control 112 indicating that data on I/O bus 111 is to be sent to a particular channel, the appropriate one of UARTs 115a–115i will be addressed and the data from I/O bus 111 will be transmitted to the appropriate UART for further transmission to the selected channel. The significance of this will become apparent from the description of each station hereinbelow.

Figure 2:
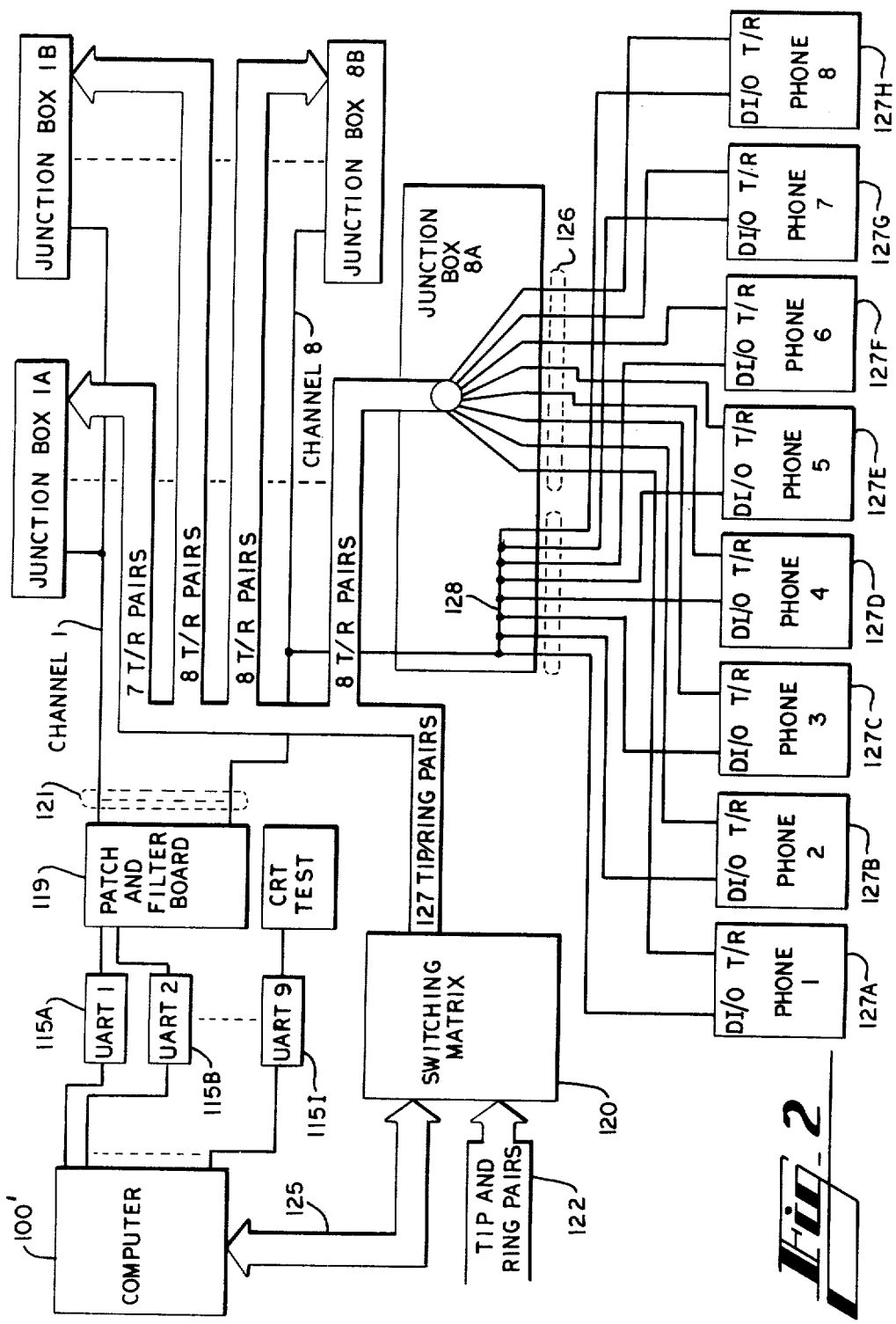
FIG. 2 is a block diagram of the data distribution system and audio signal path distribution system of the first preferred embodiment of the present invention.

FIG. 2 is a diagram of the data distribution and the audio path distribution arrangement of the first preferred embodiment of the present invention. In FIG. 2, computer 100' is a block that will be understood to include computer 100, RAM array 110, and status and read/write control circuitry 112 of FIG. 1A. The outputs of UARTs 115a–115i are provided through a patch and filter board 119 to the data channels of the first preferred embodiment. It will be understood by those skilled in the art that eight data channels are contained within dashed loop 121 on FIG. 2. Patch and filter board 119 is simply a panel for connecting serial inputs and outputs of UARTs 115a-115i to the appropriate data channels within the PABX and that distributed on this board there are ferrite bead low pass filters for filtering unwanted high frequency noise.

The first preferred embodiment of the present invention provides data between computer 100' and the various stations of the PABX along a full duplex data transmission path meeting the requirements of standard RS232C. The first preferred embodiment transmits and receives data at 9600 BAUD. Therefore, each channel of channel lines 121 will be understood to have a line for carrying serial data from patch and filter board 119 to the stations associated with that channel and another line for carrying information from the stations associated with the channel back to patch and filter board 119.

As may be seen from FIG. 2, computer 100' also controls and is responsive to the state of switching matrix 120. Switching matrix 120 is a switching matrix which connects incoming calls from the trunks comprising tip and ring pairs 122 to the 127 tip and ring pairs of the PABX shown in FIG. 2. Bus 125 is a bus through which computer 100' controls the operation of switching matrix 120 and receives information as to the particular trunk from tip and ring pairs 122 that is currently connected to a particular station of the PABX. Switching matrix 120 may be embodied by a conventional cross point switching matrix but is preferably of the type of PABX switching matrix disclosed in U.S. Pat. No. 4,028,498 which is assigned to the assignee of the present invention. U.S. Pat. No. 4,028,498 is hereby incorporated by reference as if set forth in full herein. It will therefore be understood that when computer 100' has effected a connection between an incoming call on a trunk of tip and ring pairs 122 to a paticular station of the PABX, the memory of computer 100' will contain information that the particular trunk is connected to a particular station.

The data distribution system of the first preferred embodiment of the present invention includes a pair of junction boxes associated with each data channel. Each of the junction boxes, with the exception of junction box 1a, is provided with eight tip and ring pairs from switching matrix 120. Therefore each junction box may serve as eight stations of the PABX. The preferred embodiment provides only seven pairs to junction box 1a because of a software design that used an address code which would address a particular phone connected to junction box 1A as a dedicated code for the entire data transmission system. Therefore the omission of one telephone from one junction box in the preferred embodiment to provide a test mode is not to be considered as limiting the scope of the present invention.

Junction box 8a of channel 8 is shown in detail in FIG. 2. It is to be understood that junction box 8a is representative of the sixteen junction boxes of the first preferred embodiment of the present invention. As may be seen from FIG. 2, eight tip and ring pairs shown as 126 are provided to junction box 8a. One tip and ring pair of tip and ring pairs 126 is provided to each of eight stations 127a-127h. As shown in FIG. 2 the full duplex data transmission path of channel 8 is provided to line 128 (which will be understood to have a pair of lines connected to lines 116h and 117h shown in FIG. 1A) which is tapped (or buffered by amplifier electronics at intervals as required) at eight places, one for each of stations 127a-127h.

It may therefore be seen that line 128 is a tap on channel 8 which has a multidrop connection to stations 127a-127h and furthermore that eight stations will be similarly connected to channel 8 at junction box 8b. Since junction boxes 1b, 2a, 2b-8b each support eight stations, and junction box 1a supports seven stations it may be seen that the first preferred embodiment will support 127 PABX stations. It is to be understood that the selection of eight stations per junction box and sixteen stations per channel is a feature of the first preferred embodiment and is not a limitation of the present invention, and that the data transmission system of FIG. 2 is exemplary of an addressable multidrop data transmission system for a PABX.

Figure 3A:
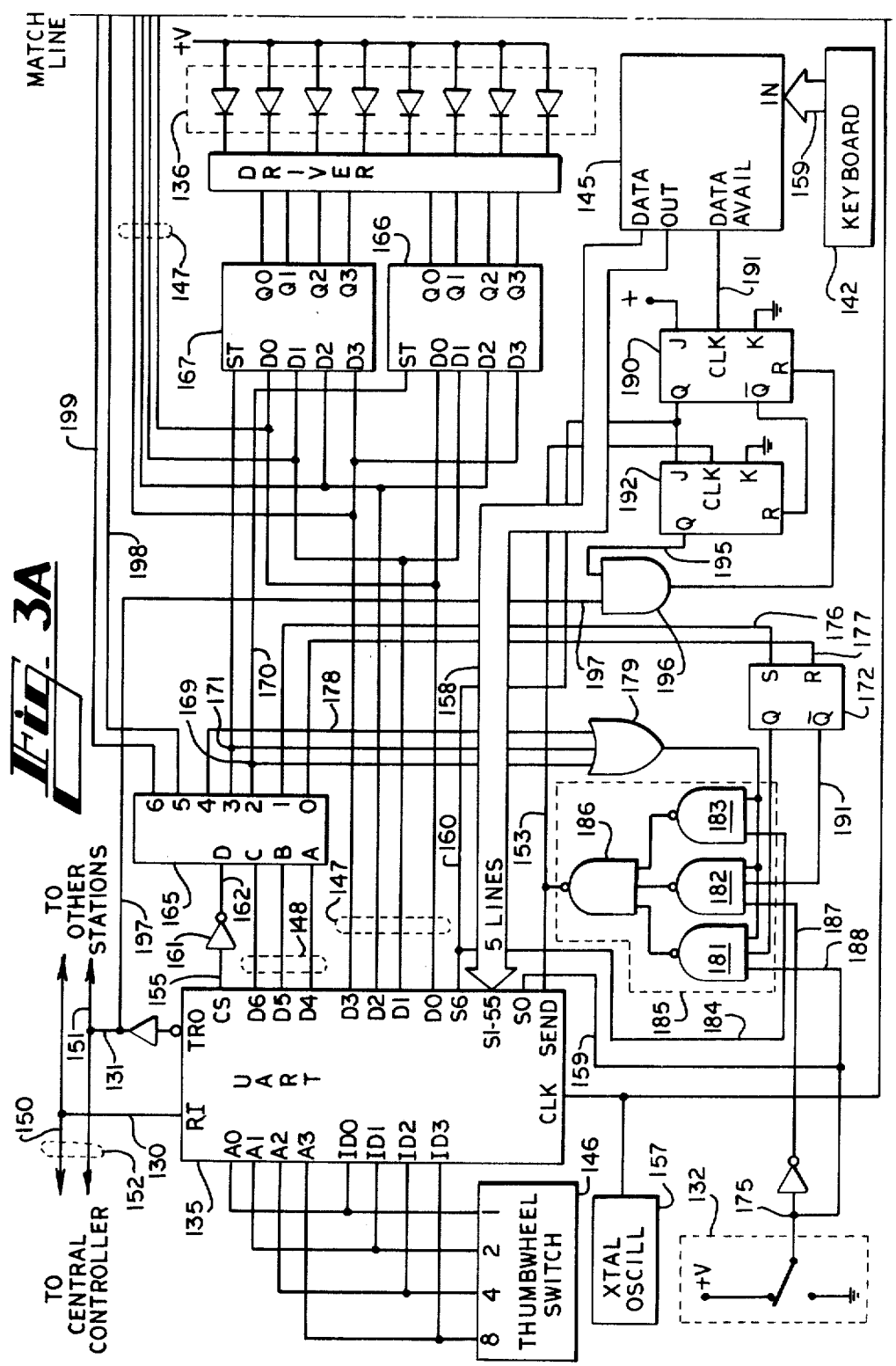
FIGS. 3A and 3B are a schematic of the information display control, display, and data transmission system for each station of the first preferred embodiment of the present invention.
Figure 3B:
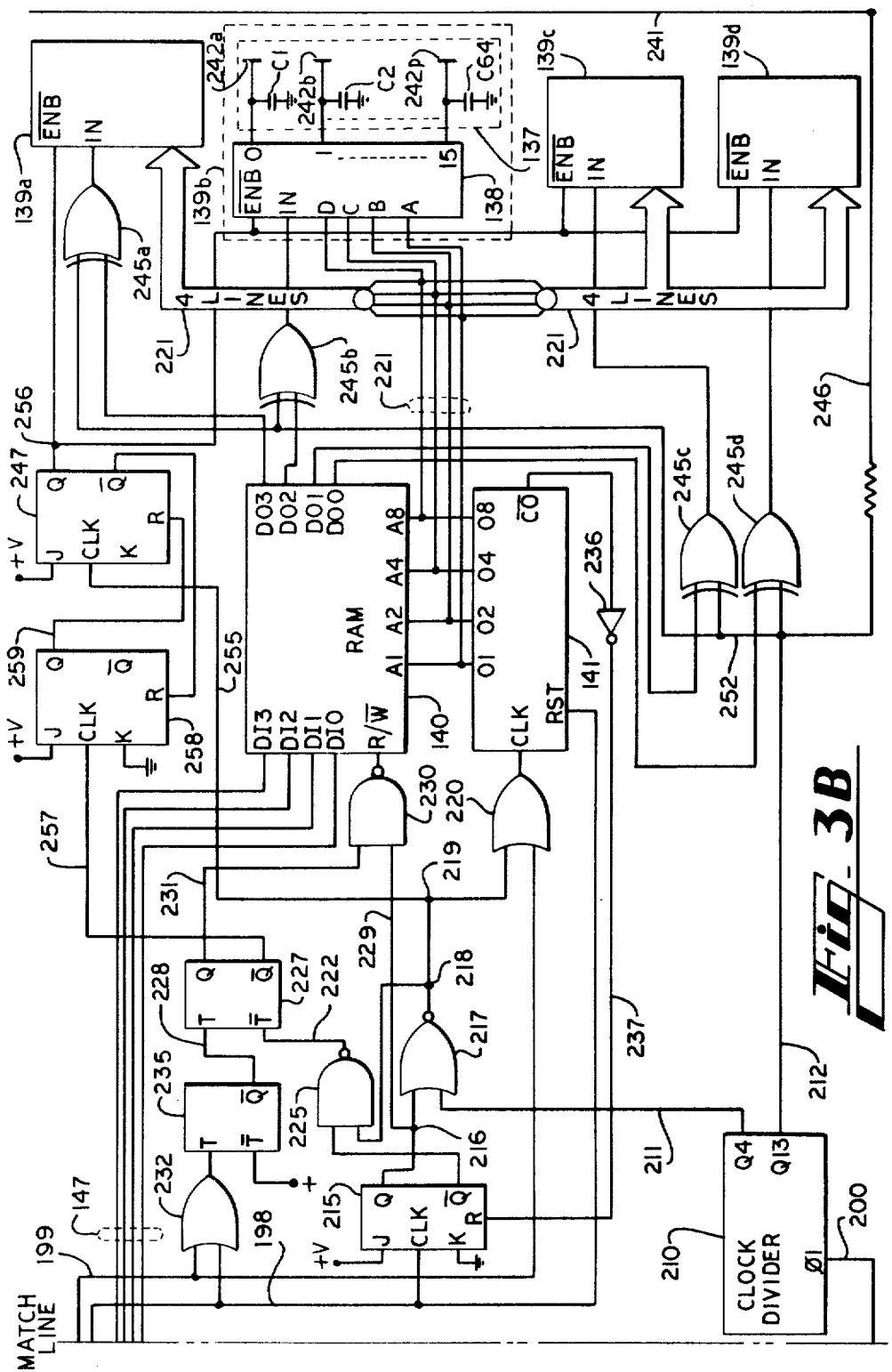

FIGS. 3A and 3B are a schematic diagram of the data receiving and transmitting circuitry at one station of the PABX shown in FIG. 2. It is to be understood that the circuitry shown in FIGS. 3A and 3B will be present in each of stations 127a-127h of FIG. 2 and also in each of the stations associated with junction boxes 1a-7b, and 8b of FIG. 2. The circuitry of FIGS. 3A and 3B communicates with the central controller via read input (RI) line 130 and transmit out (TRO) line 131. Data I/O bus 128 of FIG. 2 will be understood to represent bus 152 of FIG. 3A. Addressable UART 135 is the interface between the data receiving and transmission circuitry of the station and lines 130 and 131. It will be appreciated by those skilled in the art that lines 130 and 131 are connected to Channel bus 152 together with the RI and TRO lines of up to fifteen other stations. Channel bus 152 is connected to one of the SO and SI line pairs of a channel UART as shown in FIG. 1A. For example, if UART 135 in FIG. 3A is communicating on channel 1 of the system shown in FIG. 2, then line 130 would be connected along line 150 of bus 152 to line 116a of UART 115a shown in FIG. 1A. Similarly line 131 would be connected along line 151 of bus 152 to line 117a shown in FIG. 1A.

The data circuitry of the station includes a hook switch 132, the condition of which will indicate whether the head set (or hand set) of the station operator is currently plugged into the station. Of course, hook switch 132 may also be embodied with a manually operable switch indicating whether the station operator is prepared to receive incoming calls or is absent from the station for some reason.

The circuitry also controls the status of eight light-emitting diodes (LEDs) 136. Each station includes a four section sixteen segment liquid crystal display, one section of which is shown as block 137, FIG. 3B. Each section of the liquid crystal display is driven by an analog multiplexer 138 with data stored in capacitors C1-C64 during scanning of the various segments shown in FIG. 3B. It should be understood that the combination of analog multiplexer 138 and sixteen segment liquid crystal display 137 comprise block 139b shown in FIG. 3B and that the contents of blocks 139a, 139c, and 139d are identical to the detailed contents shown in block 139b. The coded data to be displayed in the liquid crystal display sections of blocks 139a-139b is contained in a four by sixteen random access memory 140 which is addressed by scan counter 141.

Each station also includes a keyboard 142, the output of which is provided to a keyboard encoder and contact debouncer 145. The debounced coded outputs of keyboard 142 are provided from debouncer 145 to UART 135 to be transmitted back to the central controller. It is to be understood that keyboard 142 corresponds to keyboard 20 shown in FIG. 1C.

In order to understand the operation of the station data circuitry of the first preferred embodiment, it is necessary to understand the operation of addressable UART 135. UART 135 is sequenced by a crystal oscillator 157. The first preferred embodiment of the present invention uses an addressable UART, the type MC14469 currently manufactured by Motorola Semiconductor Products, as the input and output device for each station. The UART receives data from the central controller along controller to station serial data line 150 and transmits to the controller along station to controller line 151. This type of UART has seven address inputs A0–A6, only four of which are used in the first preferred embodiment.

The first word received from line 150 of channel bus 152 through line 130 is compared against the logic state on inputs A0–A3 to determine if the next serial word to appear on line 150 is addressed to UART 135. The address bits A0–A3 are set by a conventional thumbwheel switch 146 which may be preset to provide a binary output between 0000 and 1111. Thus the first preferred embodiment allows sixteen stations per data channel. If the address bits do not compare on a one for one basis, the UART will ignore the next serial word from line 150. The word following the ignored word is again tested for comparison of specified bits in the word to the address inputs.

If the specified bits of the serial data word from line 150 compare favorably with the digital word at inputs A0–A3, the UART will accept the next serial word through line 130 and its RI input. The accepted word is read into the UART, and after parity, stop and start bits have been stripped, a seven bit data output word is provided on outputs D0–D6. Outputs D0–D3 comprise a four bit data bus 147 and outputs D4–D6 comprise a three bit command bus 148. When the UART detects that stable data is latched onto outputs D0–D6, a logical one is provided on line 155 from the command strobe (CS) output of the UART.

When a valid address is present on identification inputs ID0–ID3, a logical one on line 155 which is connected to the SEND input of UART 135 will cause the UART to transmit two serial words through the negated transmit out (TRO) output to channel bus 152. The first word includes an indentification address, four bits of which correspond to inputs ID0–ID3. The first identification word from the UART allows the channel UART controlling channel bus 152 to identify the particular UART connected to bus 152 which transmitted the word about to be received. Since thumbwheel switch 146 controls identification inputs ID0–ID3 with the same binary number present at address inputs A0–A3, the UART will identify itself by transmitting the particular address associated with the particular UART 135 upon transmission of data. The second word transmitted from UART 135 includes a string of seven bits from inputs S0–S6.

Data transmitted into each station of the first preferred embodiment controls an array of eight LEDs 136 which are the status indicator lights. As explained hereinbefore these status lights appear on the front panel of the station telephone to inform the operator as to station status. Incoming data from UART 135 also supplies input to random access memory 140 which controls the four sixteen segment sections of the liquid crystal display in blocks 139a–139d.

Output from the station through UART 135 includes a five bit output from keyboard encoder 145 which appears on keyboard bus 158 to inputs S1–S5. It is to be understood that a cable 159 connects keyboard 142 to encoder 145.

It will be appreciated by those skilled in the art that UART 135 provides a transmitting means for providing communication signals from the station to controller 100'.

The data transmitted out of UART 135 also includes a station status bit which appears on line 159 to the S0 input of UART 135. The state of line 159 will inform the central controller as to whether the station is presently on-hook or off-hook. The last bit transmitted from the station appears on line 160 to the S6 input of the UART. The status of line 160 indicates whether the data at inputs S1–S5 from the keyboard is a keyboard output which has been previously transmitted by the UART and is therefore to be ignored by the controller or is a word from the keyboard which the controller is "seeing" for the first time.

As indicated above, a three bit instruction bus 148 is connected to outputs D4–D6 of UART 135. These three bits form a command signal which indicates the operation within the station that is to be performed. When a logical one appears from the command strobe output on line 155 indicating that valid data is available at outputs D0–D6, this logical one is inverted by inverter 161 supplying a logical zero to line 162. Line 162 is connected to the most significant bit of the input is to a four bit to one of sixteen decoder 165.

Decoder 165 will be referred to as the command decoder. As may be seen from FIG. 3A, seven command lines appear at outputs 0–6 of command decoder 165. Therefore, whenever line 155 is in a logical zero state, indicating that there is no valid data present on the data outputs of UART 135, the most significant input bit on line 162 to command decoder 165 will be one therefore assuring that the output of command decoder 165 is one of outputs 8–15. When the command strobe of UART 135 indicates no valid data present on the data outputs, command decoder 165 will not provide a command output since its outputs 8–15 are not connected to the logic circuitry of the station.

When line 155 goes high, the most significant bit of command decoder 165 goes low indicating that one of the outputs 0–7 of decoder 165 will be activated.

The software from the controller for the first preferred embodiment of the present invention issues commands as follows:

0 set status latch to off-hook
1 set status latch to on-hook
2 update A group status lights
3 update B group status lights
4 test status (dummy)
5 begin RAM load, load first word
6 count RAM address, load word The response of the circuitry shown in FIGS. 3A and 3B to these commands is explained in detail in the following description of operation of the station logic circuitry.

In the examples to follow, it will be understood that each time a data word is read into UART 135 along line 130, the appropriate address word preceded the data word so that UART 135 and only UART 135 is receiving the information from channel bus 152. When the address word does not correspond to the address set by thumbwheel switch 146, it will be understood that another UART connected to channel bus 152 is to receive the following status word.

In the first preferred embodiment of the present invention, commands 2, 3, 5, and 6, load data from data bus 147 into a memory device within the station logic circuitry. The memory devices of the station include a pair of four bit latches 166 and 167 which control status lights 136 and RAM 140 which controls a liquid crystal display. Therefore commands 2, 3, 5, and 6 comprise a subset of the commands which results in the loading of data which will provide visible indications at LED's 136 and liquid crystal display 137.

Latch 166 controls the four lower LEDs of status light array 136 and are referred to as "group A lights". The remaining four LEDs of status light array 136 which will be referred to as "group B lights" are controlled by latch 167.

Assume for the moment that a word received by UART 135 is a command to update the status of the group A lights. When valid data is available on outputs D0–D6, a logical zero appears on line 162. Binary 010 appears on outputs D4–D6, respectively. Output D4 of UART 135 is connected to the least significant bit of command decoder 165 and output D6 is connected to the most significant input bit of command decoder 165. The 010 on command bus 148 is deocded by command decoder 165, which provides a logical one on the 2 output of the decoder. This logical one appears at point 169 and is provided along line 170 to the strobe input of four bit latch 166. Therefore, command 2 strobes the latch controlling the group A lights and prepares the latch to accept data at its inputs D0–D3. As may be seen from FIG. 3A, inputs D0–D3 of latch 166 are connected to data bus 147. Therefore, a command 2 signal which appears as a 010 on command bus 148 is decoded as a command 2 and latches the data from data bus 147 onto the outputs of latch 166, thus controlling the four LEDs comprising the group A lights.

In a similar manner a 011 on command bus 148 will be decoded as command 3 by decoder 165, which will provide a logical one to point 171 which strobes four bit latch 167. Inputs D0–D3 of this latch are also connected to data bus 147 and thus command 3 latches the current inputs of the group B lights.

One of the novel features of the data distribution system of the present invention is the manner in which a system both controls and responds to the state of status latch 172. The state of status latch 172 indicates whether the central controller "thinks" the station is on-hook or off-hook. Recall that the state of hook switch 132 is controlled by whether the head set for the station is currently plugged into the station. When the station operator leaves the station for some reason, to go to lunch for example, the station should be unplugged to place hook switch 132 in the state shown in FIG. 3A. When the operator is at the station and the headset is plugged in, the contact of hook switch 132 will be connected to ground providing a logical zero at point 175. Thus, the vacant, at work, and available modes can be discerned from the status of the hook switch 132 and the status of two keys from keyboard 142.

Whenever the central controller believes that a change of state has taken place for hook switch 132, it will transmit a command to UART 135 indicating that status latch 172 should be set or cleared. As may be seen from FIG. 3A, command 1 (001 on bus 148) is decoded to provide a logical one on line 176 which sets status latch 172. This indicates that the central controller believes that the particular station associated with UART 135 is on-hook. In a similar manner, command 0 (000) is decoded to provide a logical one on line 177 which clears status latch 172 indicating that the controller "thinks" the station is off-hook.

Therefore it may be seen that status latch 172 provides a status indicator means for providing a signal condition on its outputs corresponding to an indicated status of hook switch 132. The indicated status being the state in which the controller "thinks" the hook switch to be.

The station logic circuitry of the first preferred embodiment of the present invention will transmit a data word back to the central controller whenever there is a discrepancy between the state of status latch 172 and the state of hook switch 132 and the station receives one of a plurality of command signals: command 2, 3, or 4. A decoded command 4 (100 on bus 148) provides a logical one on line 178. Note that points 169 and 171 and line 178 all provide inputs to OR gate 179. Therefore OR gate 179 will provide an output on line 180 whenever a command 2, 3, or 4 is received and decoded by command decoder 165.

Line 180 provides an input to each of NAND gate 181–183 and therefore provides an enable input to these NAND gates. Whenever line 180 is a logical one, the NAND gate are enabled to respond to their other inputs and when line 180 is a zero the outputs of NAND gates 181–183 will be ones forcing the output of NAND gate 186 low. The output of NAND gate 186 is connected to line 155 which provides the SEND signal to UART 135.

NAND gates 181–183 and 186 comprise transmit controller 185. The inputs to transmit controller 185 are: line 180; both outputs of status latch 172; lines 187 and 188 which carry the inverted and noninverted states of hook switch 132; and line 189 which (through line 160) carries the logic state of the Q output of read keyboard flip-flop 190.

Assume that the controller has set status latch 172 indicating that the controller assumes the station associated with UART 135 is on-hook. Assume further that the station is on-hook and therefore the contact of hook switch 132 is connected to ground providing a logical zero at point 175. When a command 2, 3, or 4 signal appears, the logical one provided on line 180 enables NAND gates 181–183. The logical zero from point 175 is provided along line 188 to NAND gate 181 maintaining a zero output for this gate. A logical one on line 187 is provided to NAND gate 182. The third input to NAND gate 182 is provided along line 191 from the inverted output of status latch 172. Therefore line 191 is in a logical zero state maintaining a logical one output for NAND gate 182. Assume that line 189 is in a logical zero state. Therefore, the outputs of NAND gates 181–183 will all be logical ones manufacturing a logical zero on line 155 through the action of NAND gate 186.

From the foregoing description, it will be appreciated by those skilled in the art that when status latch 172 is cleared, placing a logical one on line 191, and hook switch 132 provides a logical one to point 175, line 155 will remain in a logical zero condition since at least one input to each of NAND gates 181–183 will be a logical zero.

Assume that the station operator now goes off-hook, providing a logical one to point 175. The logical one at point 175 is one input to NAND gate 181. Since the controller "thinks" the station is on-hook, the Q output of status latch 172 will be a 1 thus providing another 1 as an input to NAND gate 181. When one of the enabling command signals (2, 3, or 4) is received, line 180 goes to a logical one making all inputs to NAND gate 181 equal to one. This forces the output of NAND gate 181 low, forcing the output of NAND gate 186 high, thus providing a positive pulse on line 155. The pulse on line 155 causes UART 135 to transmit a word over line 131 to channel bus 152. One bit of this word is from input S6 connected to line 159, which thus indicates the present status of hook switch 132. Upon receipt of this word, the software of the controller makes appropriate adjustments for the fact that the station associated with UART 135 has gone off-hook, and subsequently transmits a command 0 signal back to UART 135 which clears flip-flop 172. Therefore command signals 2, 3, and 4 comprise a subset of the command signals which renders transmit controller 185 responsive to status latch 172 and hook switch 132.

From the foregoing it will be apparent that NAND gate 181 provides an output which ultimately provides a SEND pulse on line 155 whenever status latch 172 indicates the station is on-hook, and the state of hook switch 172 is in fact off-hook. It will be apparent to those skilled in the art that NAND gate 182 responds in a similar manner when the states of status latch 172 and hook switch 132 are reversed. Therefore, transmitter block 185, status latch 172, and hook switch 132 provide apparatus which is responsive to a discrepancy between the most recent signal from the controller indicating what it "believes" the station status to be, and the actual status of the station. The outputs of status latch 172 are compared to the state of hook switch 132 whenever a command 2, command 3, or command 4 input is received. Therefore, the apparatus is responsive to one of a predetermined set of command signals to compare status latch 172 and hook switch 132.

One advantage of this circuitry is that hook status data will not be transmitted unless a change from previous status occurs. Thus when the data is refreshed periodically from the computer 100, a reply (status change message) will not be transmitted if computer 100 already has the correct status for the particular station. The saving in execution time for the software by not having to continually receive redundant data from each of one hundred twenty-seven stations to determine hook switch status will be apparent to those skilled in the art.

The third condition to which transmitter block 185 responds to send a data word to channel bus 152 is when an input from keyboard 142, which has not been previously read, is available for reading. The outputs of keyboard 142 are provided through cable 159 to keyboard encoder and debouncer 145. In the preferred embodiments of the present invention, encoder 145 is of the type MM54C923 CMOS twenty key encoder currently manufactured by National Semiconductor. Key encoders of this type provide a five bit debounced output on cable 158 to inputs S1-S5 of UART 135. Encoder 145 also provides a data available signal on line 191 in response to a valid keyboard entry providing debounced outputs on cable 158.

Since read keyboard flip-flop 190 has its J input tied to a logical one and its K input to a logical zero, the rising edge of a data available signal on line 191 which is connected to the clock input of flip-flop 190 will set the flip-flop. Setting the flip-flop 190 provides a logical one along line 160 to the S6 input of UART 135. The logical one from line 160 is also provided along line 189 as an input to NAND gate 183. Whenever a command 2, 3, or 4 signal is received, both inputs to NAND gate 183 will be logical ones thus causing the output of NAND gate 186 to go high causing UART 135 to transmit a word. The logical one on line 160 will indicate to the central controller that the five bits from inputs S1–S5 constitute an encoded word from keyboard 142 which has not been previously read.

The send pulse on line 155 clocks flip-flop 192, which will set in response to the logical one output of read keyboard flip-flop 190. The setting of flip-flop 192 places a logical one on line 195 as an input to AND gate 196. Therefore flip-flop 192 sets in response to a logical one from read keyboard flip-flop 190 and a send pulse on line 155. When the send pulse is applied to line 155, UART 135 begins transmitting the data from its S0–S6 inputs out along line 131 to channel bus 152. The first logical one to appear on line 131 is provided long line 197 as the other input to AND gate 196. When both of its inputs are one, AND gate 196 directly resets flip-flop 190, the inverted output of which directly resets flip-flop 192.

Flip-flop 192 and AND gate 196 prevent the spurious clearing of read keyboard flip-flop 190. Flip-flop 192 will only set upon the rising edge of a send pulse on line 155, and therefore the output of flip-flop 190 must have settled to a one prior to a send pulse appearing on line 155 before flip-flop 192 will set. This prevents the clearing of flip-flop 190 when flip-flop 190 is being set during the middle of transmission of a word on line 131.

As will be appreciated by those skilled in the art, any particular key stroke at keyboard 142 may provide stable data outputs on cable 158 for hundreds or even thousands of milliseconds. Therefore, read keyboard flip-flop 190 and its output on line 160 indicate whether the data from inputs S1-S5 are a previously-read keyboard entry or a new keyboard entry to which the controller should respond.

Command 4 which causes a logical one to appear on line 178 will enable transmitter control 185 to respond either to a discrepancy between status latch 172 and hook switch 132 or to a keyboard output from flip-flop 190. Other than this function, command 4 may be thought of as a "dummy" command. The software of the controller of the first preferred embodiment of the present invention will transmit a command 4 to the stations of the PABX whenever the activity of the system is such that the controller is not occupied with more important business.

The remaining commands 5 and 6 from command decoder 165 cause data to be loaded into RAM 140 shown in FIG. 3B and thus update the liquid crystal display (LCD) of blocks 139a–139d. Commands 5 and 6 appear as logical ones on lines 198 and 199, respectively. Note also that the output of crystal oscillator 157 is provided along line 200.

Turning to FIG. 3B, it may be seen that lines 198, 199, and 200 together with data bus 147 are provided to the circuitry of FIG. 3B.

In the first preferred embodiment of the present invention, crystal oscillator 157 operates at approximately 614.4 kHz. This signal is provided along line 200 to clock divider 210 which, in the embodiment shown, is preferably supplied by a type CD4060B fourteen stage ripple-carry binary counter/divider currently manufactured by RCA. The Q4 output (divide by 16) of divider 210 provides an approximately 38.4 kHz signal along line 211. The Q13 output of divider 210 (divide by 16.4 k) provides a 37 Hz signal along line 212.

RAM 140 is controlled by address counter 141. When read/write flip-flop 215 is cleared, a logical zero is provided to point 216 which causes NOR gate 217 to invert the clock signal on line 211. In the absence of command 5 or command 6 signals, the output of NOR gate 217 is provided to points 218 and 219 through OR gate 220 to the clock input of address counter 141. It will therefore be appreciated that when read/write flip-flop 215 is cleared, counter 141 will count continuously. Continuous counting of address counter 141 increments the four address bits of RAM 140 and also continually causes a sequence of binary numbers from 0000 to 1111 to appear on display address bus 221. The operation of the novel multiplexed LCD display of the present invention will be explained in detail hereinbelow, but it will be understood from the foregoing description that the continual counting of counter 141 will multiplex the LCD display via address bus 221.

When a central controller detects a condition which requires updating of the contents of the liquid crystal display, a sequence of sixteen data words must be provided to UART 135 along channel bus 152. Each of these data words contains four bits of data to be written into one four bit word of RAM 140. The four data bits appear on data bus 147.

The first of the sixteen words to be written into RAM 140 is accompanied by a command 5 (101) signal on command bus 148. The remaining fifteen data words are accompanied by a command 6 (110) word on the command bus.

The loading of RAM 140 in order to update the liquid crystal display begins with the receipt of the first four bit word to be written into the RAM and a command 5 signal. The command 5 signal appears as a logical one on line 198 which clocks read/write flip-flop 215. The clocking of flip-flop 215 sets the flip-flop since its inputs are permanently in a state J=1, K=0. The setting of read/write flip-flop 215 provides a logical one to point 216. This logical one forces the output of NOR gate 217 low, providing a logical zero at points 218 and 219. The logical zero at point 219 is one input to OR gate 220, therefore OR gate 220 will provide a positive transition to the clock input of counter 141 only upon the appearance of a positive transition on line 199, the command 6 line. The logical zero at point 218 forces a logical one on line 222 through the action of NAND gate 225. Line 222 controls the negative edge trigger of one shot 227. Therefore one shot 227 is rendered unresponsive to its negative edge trigger input and will respond only to its positive edge trigger input which appears on line 228.

A logical one at point 216 is also provided along line 229 as one input to NAND gate 230. NAND gate 230 controls the READ/NOT WRITE input of RAM 140. Before the setting of flip-flop 215, line 229 was a logical zero which held the output of NAND gate 230 to a logical one, conditioning RAM 140 to read data out to its DO0L-D03 outputs. When line 229 goes high, NAND gate 230 is conditioned to invert the signal on line 231 from one shot 227. Therefore, when one shot 227 fires, a logical one appears on line 231 which will provide a negative-going write pulse as the output of NAND gate 230.

The logical one on line 198 which appears as a command 5 signal is also provided to the direct reset (RST) input of counter 141 which clears all flip-flops of the counter to zero. The rising edge of the command 5 signal on line 198 passes through OR gate 232 to the positive edged trigger of one shot 235. One shot 235 is used to provide a time delay in order that the data on data bus 147 may stabilize prior to being written into RAM 140.

When one shot 235 times out, a positive going transition appears on line 228 which triggers one shot 227. The triggering of one shot 227 provides a logical one pulse on line 231 which provides a negative going write pulse from NAND gate 230 thus writing the four bit data word from data bus 147 into the 0000 address of RAM 140.

After the first four bit word is written into RAM 140, the next fifteen four-bit words are written into the RAM with command 6 signals. The second word to be written into the RAM is accompanied by a command 6 signal which appears as a logical one on line 199. The rising edge of this logical one also passes through OR gate 232 and triggers one shot 235, which ultimately results in a write pulse as described hereinbefore. The rising edge of the one on line 199 also passes through OR gate 220 and clocks address counter 141 from 0000 to 0001. Thus, the data present on data bus 147 will be written into the 0001 address of RAM 140 upon the firing of one shot 227.

The remaining four bit data words to be written into RAM 140 are also preceded by command 6 signals. When the sixteenth word is to be written into address 1111 of RAM 140, the negated carry out (CO) output of counter 141 will go high when the clock signal from OR gate 220 goes low. Counter 141 in FIG. 3B is a type CD40193B CMOS up-down counter currently manufactured by RCA. The clock input (CLK) shown for clock 141 is the count up input of the type 40193 counter.

When the clock signal goes low, at the end of the command 6 pulse on line 199, the negated carry out output goes to a zero which is inverted by inverter 236, thus providing a logical one on line 237. The logical one on line 237 is provided to the direct reset input of read/write flip-flop 215 and thus clears this flip-flop. Since the command signal on line 199 and the four bit word on data bus 147 are of equal duration, it is apparent that the last four bit word will be written into address 1111 of RAM 140 prior to the falling edge on line 199, which ultimately forces the negated carry out output of counter 141 low.

When the logical one on line 237 clears read/write flip-flop 215, the circuitry of FIG. 3B is again in its scan mode in which counter 141 will continually count, and NAND gate 231 provides a logical one to the READ/NOT WRITE input of RAM 140.

The logic circuitry of each station of the first preferred embodiment of the present invention also includes a novel multiplexed liquid crystal display. As noted hereinbefore, each of blocks 139a–139d are identical and the details are shown in block 139b. Each of blocks 139a–139d correspond to one sixteen segment liquid crystal display and an analog multiplexer shown as 240 in display block 139a. In the preferred embodiment, multiplexer 240 is a type CD4097B CMOS analog multiplexer currently manufactured by RCA.

All four sections 139a–139d of the liquid crystal display have a common back plane 241. The individual segments of LCD section 137 are shown as 242a–242p.

As may be seen from FIG. 3B, the address inputs (A-D) of each of the analog multiplexers of LCD blocks 139a-139d are all tied to the common address bus 221 driven by counter 141. The input to each of LCD blocks 139a-139d comes from an EXCLUSIVE OR gate 245a-245d.

Since the address inputs of all the analog multiplexers are tied to a common bus, for any given state of counter 141 the input of each multiplexer will be provided to the same segment of each section of the LCD display in blocks 139a-139d.

EXCLUSIVE OR gates 245a-245d have, as a common input, the 37 Hz signal which appears on line 212. The other input for each of EXCLUSIVE OR gates 245a-245d are provided from the data outputs, DO3-DO0, respectively. Note also that the 75 Hz signal on line 212 is provided through line 246 to back plane 241.

As is known to those skilled in the art, it is necessary to prevent a constant DC offset from appearing between the back plane of a liquid crystal display and any particular segment, since a rather small net DC voltage therebetween sustained over a long period of time will destroy the liquid crystal device. By providing a common input between back plane 241 and each of EXCLUSIVE OR gates 245a-245d and by providing the data to be displayed in each segment as the other input to the EXCLUSIVE OR gates, the present invention provides a novel way of multiplexing a liquid crystal display without the danger of the segments solidifying and without the use of flip-flop data latches.

Assume that address bus 221 is providing all zeros. Therefore multiplexer 240 will route the output of EXCLUSIVE OR gate 245b to segment 242a of LCD section 137. If the DO2 output of RAM 140 is a logical zero, EXCLUSIVE OR gate 245b will pass the logic state present on line 252 through to its output. Since line 252 will be in the same logical condition as back plane 241, no potential difference will appear between segment 242a and back plane 241.

If the DO2 output of RAM 140 is a logical one, EXCLUSIVE OR gate 245b will invert the logic state on line 252. Therefore, a logical one data input to EXCLUSIVE OR gate 245b from the DO2 output of RAM 140 will assure that the logic state on segment 242b is the opposite of the logic state of back plane 241 thus activating that particular segment of the LCD.

Therefore it may be seen that EXCLUSIVE OR gates 245a-245d comprise a switching means for providing the input of mul tiplexers 139a-139d with non-inverted data when the clock signal on back plane 241 is zero and inverted data when the clock signal is a one.

Since address counter 141 is driven by a 38.4 kHz clock signal on line 211 when it is in its scan mode, each segment of the four LCD sections is updated approximately every 390 microseconds. The signal on back plane 241 and line 252 from line 212 is 37 Hz and therefore changes state approximately once every 26 milliseconds. The capacitors attached to each of segments 242a-242p, together with the output resistance from multiplexer 240, provide a sufficient time constant to maintain the appropriate voltage for each segment while the remaining segments are being updated.

Another novel feature of the multiplexed LCD display of the present invention is the apparatus shown in FIG. 3B for removing spikes from the outputs of analog multiplexer 240 when the address inputs of the multiplexer are changing. This allows use of a CMOS analog multiplexer and a multiplexed display without the output spikes which normally accompany address changes on an analog multiplexer. This is provided by spike blanking flip-flop 247 and the circuitry associated therewith. In the scanning mode, read/write flip-flop 215 is cleared providing a logical one as one input to NAND gate 225. This logical one conditions NAND gate 225 to invert the clock signal at point 218 and provide this inverted signal along line 222 to the negative edge trigger of one shot 227. Therefore, one shot 227 will trigger upon the rising edge of the clock signal at point 218, which is also the clock signal that clocks counter 141. The clock signal at point 218 is also present at point 219 and provided along line 255 to the clock input of spike blanking flip-flop 247. Therefore, upon a rising edge at point 219, flip-flop 247 is set since it has a permanent J=1, K=0 input state.

The setting of flip-flop 247 provides a logical one to point 256. Point 256 is connected to the negated ENABLE (ENB) inputs to each of the analog multiplexers and LCD blocks 139a-139d. As will be appreciated by those skilled in the art, a logical one on a negated ENABLE input for an analog multiplexer maintains all of the outputs of the multiplexer in their logical zero state. It has been found that disabling the outputs of an analog multiplexer will prevent the normal spikes associated with changes on the address inputs.

Since one shot 227 fired (after the propagation delay through gate 225) on the same edge which sets flip-flop 247, flip-flop 247 will not clear until one shot 227 times out. The period of one shot 227 is on the order of a few microseconds and when this one shot times out, a rising edge appears on line 257 which clocks flip-flop 258. The clocking of flip-flop 258 provides a logical one on line 259, which is connected to the direct reset input of flip-flop 247. The resetting of flip-flop 247 applies a logical zero to point 256, which enables the analog multiplexer of LCD sections 139a-139d to route the signal at their inputs to the appropriate output selected by the address on address bus 221. The resetting of flip-flop 247 also resets flip-flop 258 because of a logical one which appears on line 261. It will therefore be appreciated that flip-flops 247 and 258 comprise a means for providing a disabling pulse upon each occurrence of an address change on address bus 221.

Since address counter 141 is being clocked by a signal of approximately 38.4 kHz and there are sixteen segments in each of the analog multiplexers such as multiplexer 138, each segment is activated for approximately 26 microseconds. The selection of the period of one shot 227 to be on the order of a few microseconds causes the disabling output from flip-flop 247, which appears at point 246, to be brief with respect to the period in which each segment is being updated. Note that the rising edge at point 219, which clocks flip-flop 247 to disable the analog multiplexers, must pass through gate 220 and therefore the clock signal to counter 141 will be delayed by the propagation delay through gate 220. This delay is sufficient to assure that the multiplexers will be disabled by the time counter 141 responds to the rising edge at its clock input and begins changing the address on bus 221. It will be apparent to those skilled in the art that if the particular gate 220 does not have sufficient propagation delay, buffers may be added between this gate and the clock input of counter 141 to assure the disabling of the multiplexers prior to changes on address bus 221.

A block diagram of the interface between the central controller and the data distribution system of the second preferred embodiment of the present invention is shown in FIG. 1B. CPU and program memory unit 300 control status and read/write control block 312, which in turn controls the input and output of data to and from RAM array 310. CPU and program memory 300 communicates with RAM array 310 and a plurality of interface ports along I/O bus 311. Control bus 318 is responsive to instructions from CPU and program memory 300 to control the flow of data on two eight bit bidirectional buses 321a and 321b and two unidirectional four bit instruction buses 320a and 320b.

These buses are interfaced with the computer I/O bus 311 by five latched I/O ports. As will be understood by those skilled in the art, latched I/O ports 315a, 315b, 316a, 316b, and 317 may be embodied by a type 8212 Scottky bipolar I/O port. Ports 315a and 315b carry data passing from I/O bus 311 out to the data circuitry of the PABX stations on buses 321b and 321a, respectively. Similarly I/O ports 316a and 316b carry data coming from the stations to I/O bus 311. Port 317 carries instruction signals on two one-way instruction buses 320a and 320b which flow from the controller to the stations.

FIG. 4 is a block diagram of the data distribution system of the second preferred embodiment of the present invention. It will be understood that computer 300' comprises the elements shown in FIG. 1B, and that channel 1 and channel 2 emanating from computer 300' comprise buses 320a, 320b, 321a, and 321b. The buses are connected to a patch and filter board 319 which is used for patching the buses from computer 300' to the channel buses of the second preferred embodiment and includes ferrite bead high frequency noise filters.

Computer 300' controls and maintains a memory of the connections within switching matrix 120' in the same manner that computer 100' responds to switching matrix 120 in the first preferred embodiment. Switching matrix 120', under the control of computer 300', distributes incoming calls from outside tip and ring pairs 122' to two internal tip and ring pair channels 322a and 322b. On the PABX side of patch and filter board 319, buses 320a, 320b, 321a, and 321b continue and are provided to a plurality of junction boxes. The junction boxes for channel 1 are shown as block 325a and the boxes for channel 2 are shown as 325b. It is to be understood that block 325a represents a plurality of junction boxes, each serving up to twelve phones in the second preferred embodiment. It is to be understood that each of the channels 1 and 2 may serve as sixty-four phones, in the second preferred embodiment one phone is omitted from one of the channels.

As may be seen from FIG. 4, the sixty-four phones associated with channel 1 each have one of tip and ring pairs 322a' associated therewith. Each phone also is connected to the twelve bit data, ID, and instruction bus shown as 326 which will be understood to comprise buses 320a and 321a.

Figure 5:
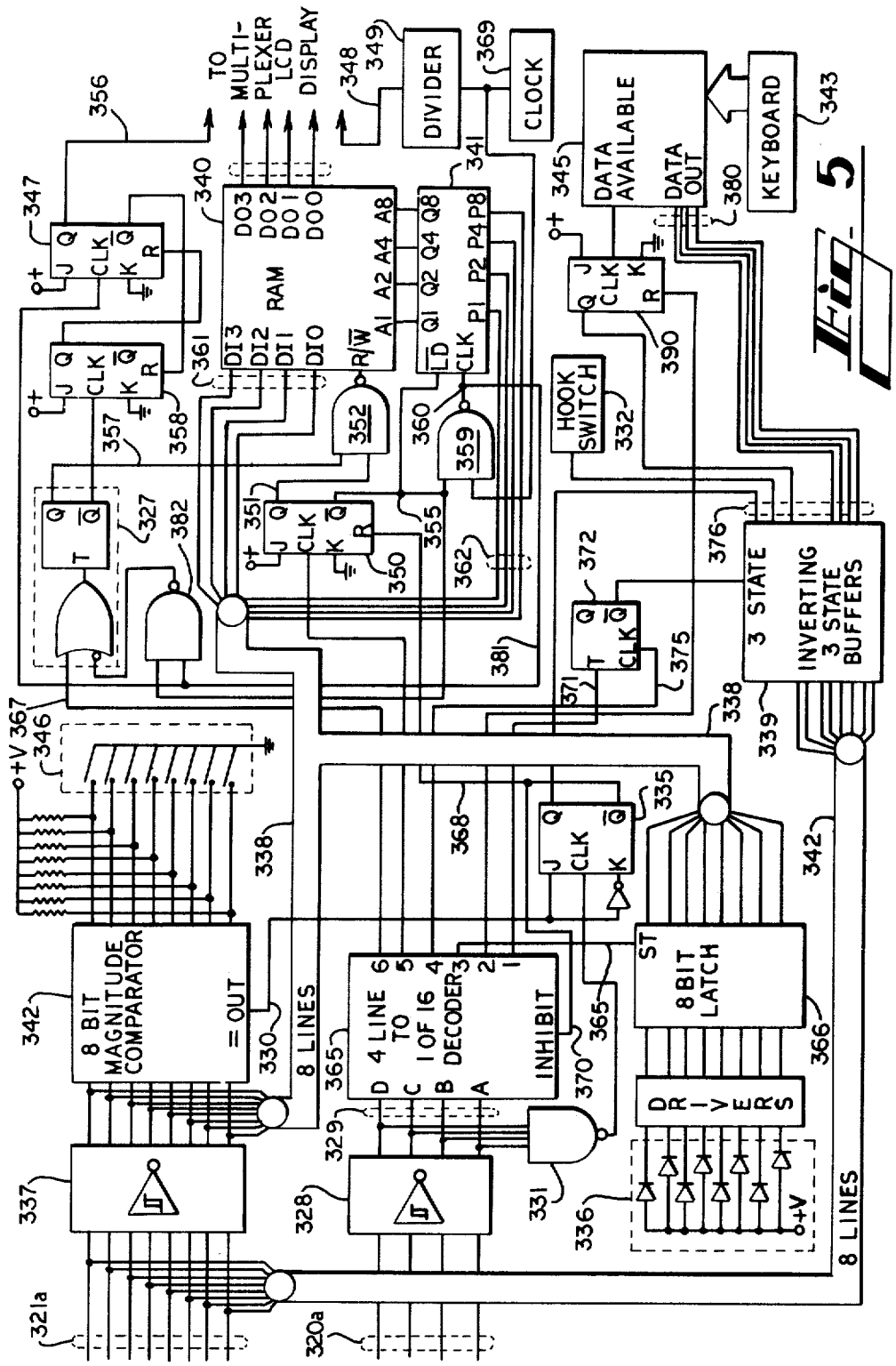
FIG. 5 is a schematic diagram of the display control, the display, and data transmission apparatus for each station of the second preferred embodiment of the present invention.

FIG. 5 shows the station logic circuitry for the second preferred embodiment of the present invention. It is assumed that the station shown is connected to channel 1 and, therefore, eight bit bidirectional ID and data bus 321a is provided to the station shown in FIG. 5 as well as the remaining sixty-three phones associated with channel 1. Similarly, four bit instruction bus 320a is shared by the station shown in FIG. 5 with the other phones of channel 1. While the second preferred embodiment also embodies the principle of an addressed multidrop data distribution system for a private branch exchange, the software from controller 300' (shown in FIG. 4) has a different set of decoded commands than the first preferred embodiment. As may be seen from FIG. 5, bus 320a is buffered from the remainder of the station logic circuitry by a set of inverting Schmitt trigger buffers 328. Therefore, each line of instruction bus 320a is inverted prior to becoming bus 329 which provides the inputs to four bit to one of sixteen decoder 365. Only six of the sixteen possible states of bus 329 are decoded into commands in the second preferred embodiment. The commands used in the second preferred embodiment of FIG. 5 are as follows:

1. Enable keyboard output and status each
2. Clear data available keyboard flip-flop
3. Update status lights
4. Terminate keyboard output
5. Terminate LCD scan
6. Write data into RAM Since channel one eight bit ID and instruction bus 321A is bi-directional, and multiple drops are attached to bus 321A, it will be understood that the second preferred embodiment of FIG. 4 is a half duplex data transmission system in that data can only pass from the controller to a station or from a station to the controller on buses 321A and 321B at one time. All data coming from the controller into the station of FIG. 5 passes through inverting Schmidt trigger buffers 337 and is provided to an 8 bit station data buss 338. Output from the station of FIG. 5 passes through inverting three-state buffers 339 onto an 8 bit station output buss 342. As will be appreciated by those skilled in the art, when the out puts of buffers 339 are in their high impedance state, station output bus 342 will not load channel 1 ID and instruction bus 321A.

As will be appreciated by those skilled in the art, the second preferred embodiment of FIG. 5 has identification and address words transmitted to each station in parallel while the first preferred embodiment of FIGS. 3A and 3B transmit identification and data to the stations serially. It will also be apparent that each command of the first preferred embodiment only requires four data bits, whereas some commands of the second preferred embodiment require eight data bits. Therefore, in the first preferred embodiment, an eight-bit word may carry both the encoded command signal (four bits) and four bits of data in one eight bit word whereas the second preferred embodiment of FIG. 5 requires four instruction bits from bus 320a and eight data bits from buss 321a.

As in the first preferred embodiment, data words going to a station are preceded by an address (identification) word so that the stations served by the particular bus may determine whether the next data and instruction word is intended for that station. Since bus 321a comprises eight bits, 64 distinct addresses may be represented by the possible states of this bus. A set of eight switches 346 are preset to the address associated with the particular station shown in FIG. 5.

Switches 346 comprise one input to an eight-bit magnitude comparator 342. The output of inverting buffers 337 comprise the other input to eight bit magnitude comparator 342. It will be appreciated by those skilled in the art that comparator 342 may be constructed with a pair of type CD 4063B four bit magnitude comparators currently manufactured by RCA. From FIG. 5 it will be apparent that when the states of the lines comprising bus 321a are the compliment of the logic state set by switches 346, magnitude comparator 342 will provide a logical 1 on its EQUAL OUTPUT which appears on line 330.

When an address word appears on bus 321a, all zeroes are provided on instruction bus 320a. All zeroes on buss 320a indicate that the word on buss 321a is an address word and not a data word. The zeroes on buss 320a are inverted by inverting buffers 328 to provide all ones on bus 329. The state of all ones on bus 329 is detected by NAND gate 331 the output of which will go low under these conditions. When instructions buss 320A changes state, at least one input to NAND gate 331 will become zero and its output will go high, causing a positive edge to appear at the clock input of flip-flop 335. The all zeroes word on instruction bus 320a is maintained for a sufficient length of time for all the propagation delays through comparator 342 to settle and therefore, when the output of NAND gate 331 goes high, a stable one or zero will appear on line 330 from comparator 342. If the address word on bus 321a is the complement of the state of switches 346, a logical one will be provided on line 330 which will cause flip-flop 335 to set. If the address on bus 321a corresponds to a station other than that shown in FIG. 5, flip-flop 335 will be cleared.

When flip-flop 335 sets, a single (instruction code, date word) pair may follow on busses 320a and 321a or a sequence of (instruction code, data word) pairs may follow. Once flip-flop 335 sets, all (instruction code, data word) pairs will be processed by the station logic circuitry of FIG. 5 until the occurrence of 0000 on bus 320a and an address on bus 321a corresponding to a different station which clears the flip-flop. It will therefore be appreciated that the following sequence of instructions is continually repeated on busses 320a and 321a.

| 320a | 321a |
|---|---|
| 0000 | ID Code |
| Instruction Code(1) | Data Word |
| Instruction Code(2) | Data Word |
| . | . |
| . | . |
| . | . |
| Instruction Code(N) | Data Word |
| 0000 | ID Code |

Each time the all zero words appears on instruction buss 320a, every station associated with channel one will test to see if the address word on bus 321a corresponds to the station address. If it does, flip-flop 335 will be set rendering the station responsive to the next (instruction code, data word) pairs. If the address does not correspond flip-flop 335 will be cleared, rendering the station insensitive to bus 321a until the next occurence of all zeroes on instruction bus 320a.

In order to understand the operation of the second preferred embodiment of FIG. 5, it will be assumed that each instruction or sequence of instructions which is decoded into a command by the coder 365 was preceded by the proper address word and that flip-flop 335 set accordingly.

Two commands of the command set for the second preferred embodiment load data into storage elements of the second preferred embodiment. Since the second preferred embodiment uses eight-bit data words, all eight status lights 336 (which will be understood to correspond to status lights 136 of FIG. 3A) may be updated by a single data word. Therefore, when command 3 is decoded, a logical one appears on line 348 from the 3 output of decoder 365 and is provided to the strobe (ST) input of an eight-bit latch 336. The logical one on line 365 renders latch 366 transparent to station data bus 338 and, when the logical one disappears from line 365, the data present on bus 338 is latched into latch 366 which thus determines which of status lights 336 will be illuminated. As in the first preferred embodiment, status lights 336 are preferably embodied by light emitting diodes.

Commands 5 and 6 are used to load data into RAM 340. It will be understood that RAM 340 may be identical to RAM 140 shown in FIG. 3B, and address counter 341 may be identical to address counter 141 of FIG. 3B. As in the first preferred embodiment, except when data is being loaded into RAM 340, address counter 341 will continually count and scan RAM 340 to provide outputs to a multiplexed liquid crystal display. It is to be understood that a multiplexed liquid crystal display (LCD) identical to that shown in FIG. 3B and described hereinabove is also used in the second preferred embodiment of FIG. 5. The LCD is driven by outputs DO0 through DO3 of RAM 340 and lines 356 and 348. The logic state of line 356 corresponds to the state of point 356 in FIG. 3B, and the low frequency clock signal on line 348 from clock divider 349 corresponds to the signal on line 212 shown in FIG. 3B.

Command 5 for the second preferred embodiment terminates the scan operation of RAM 340 and counter 341, just as command 5 of the first preferred embodiment does. However, no data is loaded in response to command 5 by the second preferred embodiment. As may be seen from FIG. 5 the decoding of a command 5 signal from decoder 365 clocks flip-flop 350, which will then set. The setting of flip flop 350 causes a logical one to appear on line 351 as one input to NAND gate 352, thus conditioning NAND gate 352 to invert the logic state on line 357.

The setting of flip-flop 350 also provides a logical zero a point 355, which is connected to negated load (LD) input of counter 341. So long as a logical zero remains at point 355, counter 351 will be transparent from its parallel inputs P1-P8 to its parallel outputs Q1-Q8. The logical zero at point 355 is applied as one input to NAND gate 359, which holds the output of this NAND gate which appears at point 360 to a logical one, thus terminating clocking of counter 341.

After the command 5 signal has been received, 16 consecutive (instruction code data word) pairs are provided by the controller on bus 321a. The instruction code is decoded by decoder 365 into command 6. Four bits of each of these data words contain the data to be loaded into a particular location of RAM 340. These four bits appear on bus 361, which will be understood to comprise four bits of station data bus 338. The remaining four bits of station data bus 338 comprise bus 362, which is provided to the parallel inputs of counter 341. Therefore, each 8 bit data word contains 4 bits of data to be loaded into RAM 340 and a 4 bit address for the location in RAM 340 into which the data is to be loaded.

When command 6 is decoded, a logical one appears on line 367 which is applied to the positive edge triggered input of one shot 327. It will be apparent that one shot 327 corresponds to one shot 227 of FIG. 3B. The firing of one shot 327 causes a logical one to appear at point 357, which is inverted by NAND gate 352, causing a negative pulse to appear at the read/not write (R/NOT W) input of RAM 340 and thereby writing the four bits on bus 361 into the address on bus 362. This will proceed until all appropriate locations of RAM 340 have been updated. It should be noted that in the example given, all address of RAM 340 were updated, but it will be apparent that it is only necessary to update certain selected address of RAM 340 in the second preferred embodiment. Since point 360 is connected to line 381 to one input of NAND gate 382 and the clock input of flip-flop 347, it will be apparent that flip-flops 347, 358 and one shot 327 will provide the spike blanking outputs to the multiplexed liquid crystal display as described hereinabove for the first preferred embodiment when RAM 340 and counter 341 are in the scan mode.

FIG. 6 shows the novel default direct trunk connection apparatus of the present invention. The default direct trunk connection apparatus provides some interim service for the PBX or PABX in the event of a computer malfunction or complete loss of power.

Block 385 represents a computer malfunction detector which will provide a logical one when either controller 100' of the first preferred embodiment or 300' of the second preferred embodiment fails to properly service the stations of the PABX. The apparence of the logical one on line 389 terminates the output of relay driver 386. When driver 386 no longer provides power, relays 387 and 388 drop off from their energized position, which is shown in FIG. 6, to their unenergized position.

When there is a loss of utility power in the building housing the PABX, the driver 388 can no longer provide an output to energized relay 387 and 388, and they will also drop off in the event of a loss of power. Relays 387 and 388 are representative of a bank of relays which depends upon the number of trunks in tip/ring pairs 122. Tip/ring pair 391 is representative of a selected group of tip/ring pairs 122 to which the stations of the PABX are to be directly connected. Tip/ring pair 392 is representative of tip/ring pairs from trunk tip/ring pairs 122 which are to be disconnected in the event of a computer failure or power loss.

As may be seen from FIG. 6, a computer failure, system failure or power loss will directly patch certain preselected trunks from tip/ring pairs 122 directly to the tip/ring pairs for the stations of the PABX by bypassing switching matrix 120. Therefore the present invention will provide a sophisticated PBX or PABX which will provide limited service for incoming calls even in the event of a computer or system breakdown or a power loss.

It will be appreciated that relay 387 provides a switching means which connects a subset of trunk lines 122 to the tip and ring pairs of the PBX upon detection of a failure condition.

FIG. 7A shows the preferred embodiment for the bus protection device of the present invention. As will be appreciated by those skilled in the art, the bus protection system of the present invention is applicable to any bus oriented multi-drop data distribution system having CMOS devices connected to the bus. Input 410 represents any input connected to a bus lead for 411. It will be appreciated by those skilled in the art that block 415 represents a generalized CMOS input. The generalized CMOS input 415 is characterized by a plurality of diodes D(1) through D(N) and a resistence 418. The cathodes of diodes D(1) through D(N) will be connected to the positive power supply input of the CMOS device. The generalized input 415 also includes a diode 417, the cathode of which is connected to the gate of a CMOS transistor and the anode of which goes to the negative power supply (ground) of the CMOS device.

As will be appreciated by those skilled in the art, diodes D(1) through D(N), resistor 418 and diode 417 are products of the integrated circuit fabrication of conventional CMOS devices. Block 420 represents one of local regulators 402a through 402n of FIG. 7B, and in the preferred embodiment of the present invention will be understood to include a rectifier and regulator for deriving a DC power supply from utility supplied alternating current. Power supply 420 is represented by the well known Thevenin equivalent comprising a voltage source 421 and an output impedence 422. Capacitance 425 will be understood to be the cumulative capacitance associated with power supply 420 and the bypass capacitors conventionally applied between power supply inputs to integrated circuit packages and printed circuit board ground.

The elegant yet simple bus protection device of the present invention comprises diode 430 connected between output 431 of power supply 420 and the CMOS device positive power supply input 435.

Consider the case when power supply 420 fails, effectively shorting voltage source 421. A well regulated supply will have a fairly low value for output impedance 422 and, under certain failure modes of common DC power supplies, supply 420 may be considered to be a short circuit. In any event, the shorting of the physical devices equivalent to voltage source 421 will place the parallel combination of output impedance 422 and capacitance 425 in parallel between the power supply input 435 of CMOS device 415 and ground. Diode 430 prevents this situation from loading bus lead 411.

Consider the case where power supply 420 can be considered to be an effective short circuit. Under these conditions, diodes D(1) through D(N) will become forward biased when the device driving bus lead 411 attempts to place a logical one on the bus. Under this condition, the bus driving device (generally shown as 405 in FIG. 7B) will be unable to raise the logic level of bus lead 411 since its output current will be sunk to ground through diodes D(1) through D(N).

In the case where diode 430 is absent and source 421 shorts, leaving a significant impedance 422 in parallel with the capacitance 425, the device driving bus 411 (405 in FIG. 7B) will continually charge this parallel RC combination whenever the device drives a voltage level on lead 411 that is higher than the present voltage across capacitance 425, forward biasing diodes D(1) thorugh D(N).

By placing diode 430 in the position shown, the foregoing problems are eliminated in the event of voltage source 421 becoming a short circuit. If the device driving bus lead 411 places a positive voltage on this lead, diode 430 will become back biased and there will be no path between bus lead 411 and ground that will load the bus. Therefore, the inclusion of diode 430 will limit the effect of a failure of power supply 420 to the devices serviced by this power supply and not affect other devices having other power supplies connected to bus lead 411.

In the preferred embodiments of the present invention, this bus protection apparatus will minimize the number of stations disabled by a local power supply failure. Turning to FIG. 2, it may be seen that each of channels 1 through 8 has two junction boxes connected thereto. As recited above, each junction box has its own local power supply. Therefore, if the power supply of junction box 1A fails, only the stations connected to junction box 1A will be disabled and the channel 1 110 bus may still service the stations of junction box 1B. In the absence of bus protection, the failure of one junction box on the channel would disable all stations on that channel.

The bus protection is more critical to the second preferred embodiment. Consider FIG. 4 and recall that each of blocks 325A and 325B represent a plurality of junction boxes associated with each channel, each junction box having up to twelve stations connected thereto. If the power supply of one junction box of channel 1 where to short, in the absence of bus protection apparatus all 64 stations of channel 1 would be put out of service. However, by providing the second preferred embodiment with the bus protection device of the present invention, only the twelve phones associated with the particular junction box having the defective supply will be taken out of service and the remaining 52 stations of channel 1 may continue to operate.

It will be appreciated by those skilled in the art that the serial and parallel preferred embodiments set forth herein are exemplary of the present invention and that the present invention has many applications in both PABX and PBX telephony and therefore the scope of the present invention is limited only by the claims below.

We claim:

1. In a private branch telephone exchange including a switching matrix for connecting a plurality of incoming trunk pairs to a plurality of stations, a controller responsive to the state of said switching matrix for storing a plurality of connection signals, each of said plurality of connection signals corresponding to connection of a particular one of said plurality of trunk pairs to a particular one of said plurality of stations, the improvement of:
   a data distribution system comprising at least one data communication channel connecting said controller to at least two of said plurality of stations;
   address defining means associated with each of said plurality of stations for providing a unique station address for each of said plurality of stations connected to said data communication channel;
   said controller further comprising an addressing means for providing a plurality of addressing signals, one at a time, to said data communication channel, each of said addressing signals being followed in time by one of a plurality of data signals, said plurality of data signals corresponding to one of said plurality of connection signals; and
   a display and control means associated with each of said plurality of stations for causing a display to provide a visible indication corresponding to said one of a plurality of connection signals in response to said plurality of data signals;
   said display and control means comprising an addressable memory connected to said display responsive to a first particular one of said plurality of data signals to load a first address of said addressable memory, and further responsive to subsequent data signals of said plurality of data signals to load sequential addresses of said addressable memory.

2. In a private branch telephone exchange including a switching matrix for connecting a plurality of incoming trunk pairs to a plurality of stations, a controller responsive to the state of said switching matrix for storing a plurality of connection signals, each of said connection signals corresponding to the connection of a particular one of said incoming trunk pairs to a particular one of said plurality of stations; means for connecting N×M stations to said private branch exchange, N and M each being positive integers, the improvement of a data distribution system comprising:
   M data communication channels;
   means for connecting N stations to each of said M data communication channels;
   said controller further comprising means for generating $2^N$ address signals for each of said M channels and for alternatively generating a contiguous sequence of display control signals, said sequence of said display control signals corresponding to one of said connection signals;
   a plurality of stations connected to each of said M communication channels,
   each of said stations comprising:
   a station identification means for providing a particular one of $2^N$ station addresses,
   a display for displaying visible indications corresponding to said sequence of display control signals, and display control means operatively connected to one of said M data communication channels for rendering said display responsive to said sequence of display control signals only when said sequence of display control signals is preceded by a particular one of said $2^N$ address signals corresponding to said particular one of said $2^N$ station addresses.

3. In a private branch telephone exchange including a plurality of stations, each of said stations including a hook switch, said hook switch being characterized by a status and being selectively operable to be placed in an off-hook status for rendering said station available to receive calls and alternately operable to be placed in an on-hook status for rendering said station unavailable to receive calls, the improvement of
   a controller for providing command signals to each of said plurality of stations;
   a status indicator means including a latching means responsive to a first one of said command signals for providing a first signal condition and responsive to a second one of said command signals for providing a second signal condition;
   said status indicator means being further responsive to said hook switch to provide an output signal condition upon detection of said first signal condition concurrent with said on-hook status and upon detection of said second signal condition concurrent with said off-hook status.

4. Apparatus as recited in claim 3 further comprising:
   a testing means for rendering said status indicator means responsive to said latching means and said status of said hook switch only upon an occurrence of a command signal from a particular subset of said command signals.

5. Apparatus as recited in claim 3 further comprising:
   a display associated with each of said stations for providing visible indications in response to each command signal of a particular subset of said command signals.

6. Apparatus as recited in claim 3 wherein
   each of said stations further comprises a transmitting means for providing communication signals from said station to said controller; and said transmitting means is responsive to provide a particular one of said communication signals in response to said output signal condition.

7. Apparatus as recited in claim 6 wherein each of said stations further comprises a keyboard comprising a plurality of switches; and said transmitting means is responsive to selective operation of each of said plurality of switches to provide a particular one of said communication signals.

* * * * *